(12) United States Patent
Yan

(10) Patent No.: US 7,073,805 B2
(45) Date of Patent: Jul. 11, 2006

(54) USER-PROPELLED RIDING TOYS AND METHODS

(76) Inventor: Hui Yan, 3611 Wyntering Trail, Marietta, GA (US) 30068

( * ) Notice: Subject to any disclaimer, the term of this patent is extended or adjusted under 35 U.S.C. 154(b) by 0 days.

(21) Appl. No.: 10/751,370

(22) Filed: Jan. 5, 2004

(65) Prior Publication Data

US 2004/0178603 A1 Sep. 16, 2004

Related U.S. Application Data

(60) Provisional application No. 60/438,230, filed on Jan. 6, 2003, provisional application No. 60/438,231, filed on Jan. 6, 2003, provisional application No. 60/440,101, filed on Jan. 16, 2003.

(51) Int. Cl.
*B62M 1/04* (2006.01)

(52) U.S. Cl. ..................................... 280/221

(58) Field of Classification Search ................ 280/221, 280/11.115, 87.042
See application file for complete search history.

(56) References Cited

U.S. PATENT DOCUMENTS

| 322,504 | A | 7/1885 | Thompson |
|---|---|---|---|
| 329,584 | A | 11/1885 | Miller |
| 1,640,476 | A | 8/1927 | Whitcomb, Jr. |
| 3,415,540 | A | 12/1968 | Portnoff |
| 4,124,222 | A | 11/1978 | Moe et al. |
| 4,152,001 | A | 5/1979 | Christianson |
| 4,411,442 | A * | 10/1983 | Rills ......................... 280/221 |
| 4,621,825 | A | 11/1986 | Lee |
| 4,645,223 | A | 2/1987 | Grossman |
| 4,828,284 | A | 5/1989 | Sandgren |
| 4,861,054 | A | 8/1989 | Spital |
| 4,915,403 | A | 4/1990 | Wild et al. |
| 5,114,166 | A | 5/1992 | McCosker |
| 5,154,436 | A | 10/1992 | Jez et al. |
| 5,192,089 | A | 3/1993 | Taylor |
| 5,224,719 | A | 7/1993 | Goodspeed |
| 5,280,935 | A | 1/1994 | Sobocan |
| 5,310,202 | A | 5/1994 | Goodspeed |
| 5,819,865 | A | 10/1998 | Cowley |
| 5,839,737 | A | 11/1998 | Kruczek |
| 6,007,074 | A | 12/1999 | Tarng |
| 6,059,303 | A | 5/2000 | Bradfield |
| 6,079,724 | A | 6/2000 | Lin |
| 6,173,981 | B1 | 1/2001 | Coleman |
| 6,626,442 | B1 * | 9/2003 | Pahis ..................... 280/11.115 |

OTHER PUBLICATIONS

U.S. Appl. No. 09/323,502, filed Jun. 1, 1999, Yan.

* cited by examiner

*Primary Examiner*—Kevin Hurley
(74) *Attorney, Agent, or Firm*—Tim Tingkang Xia, Esq.; Morris, Manning, Martin

(57) ABSTRACT

This invention is a user-propelled riding toy. A platform on which a user stands is supported by a steering mechanism that transfers a directional force from the platform; and a geartrain mounts to the wheels. The geartrain is adapted to receive a downward force from the platform, and translate a portion of the downward force into a rotational force on the wheels. The geartrain also provides an upward return force acting on the platform, and translates a directional force into a lateral force acting on the wheels. The platform is propelled forward direction by the rotational force on the wheels. Lateral forces cause two sets of wheels to pivot in opposite directions, and thereby directionally steer the platform.

20 Claims, 22 Drawing Sheets

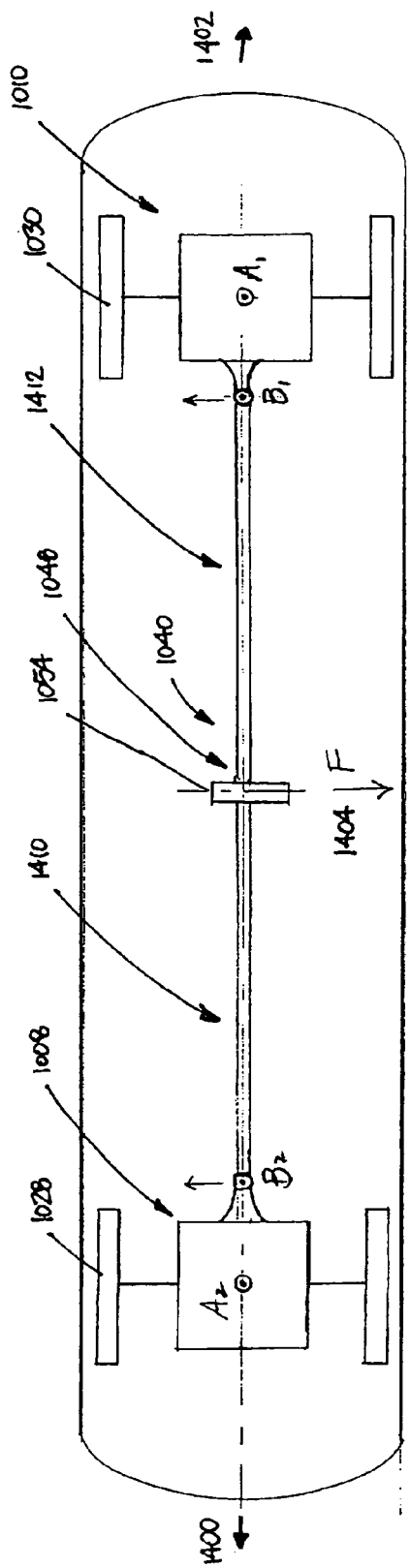
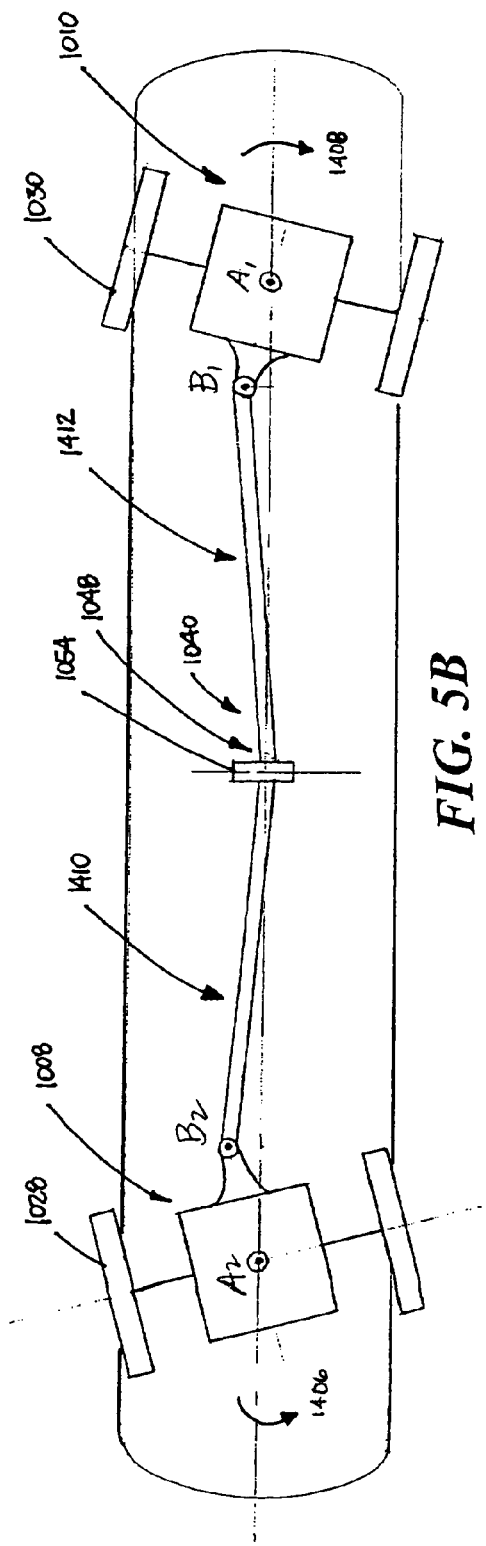
FIG. 5A
FIG. 5B

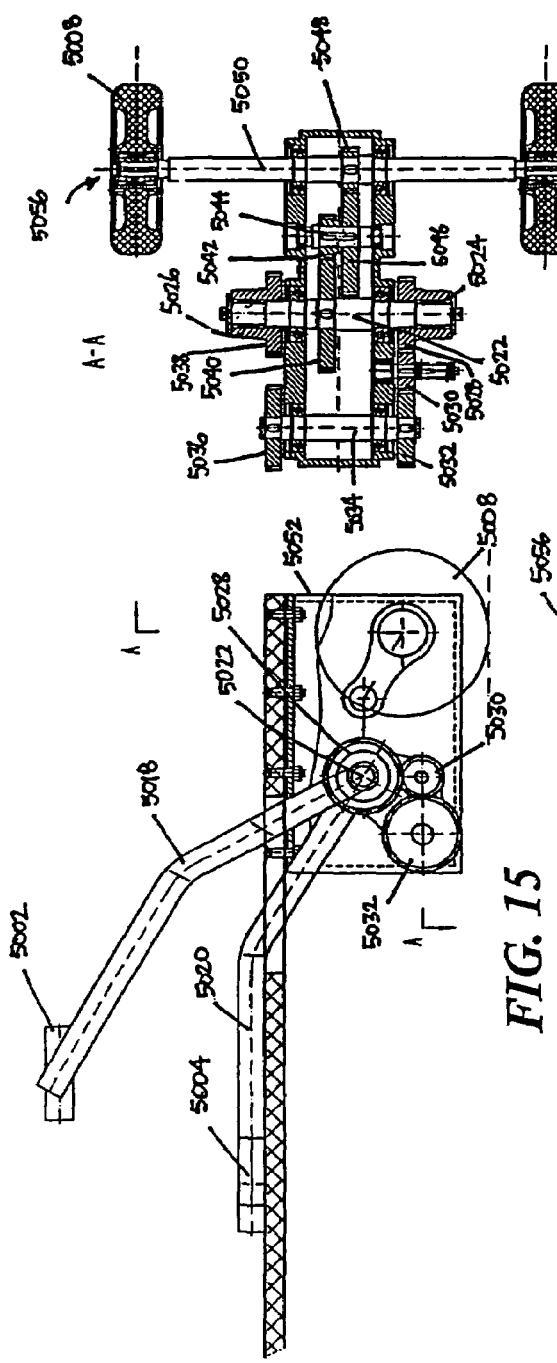
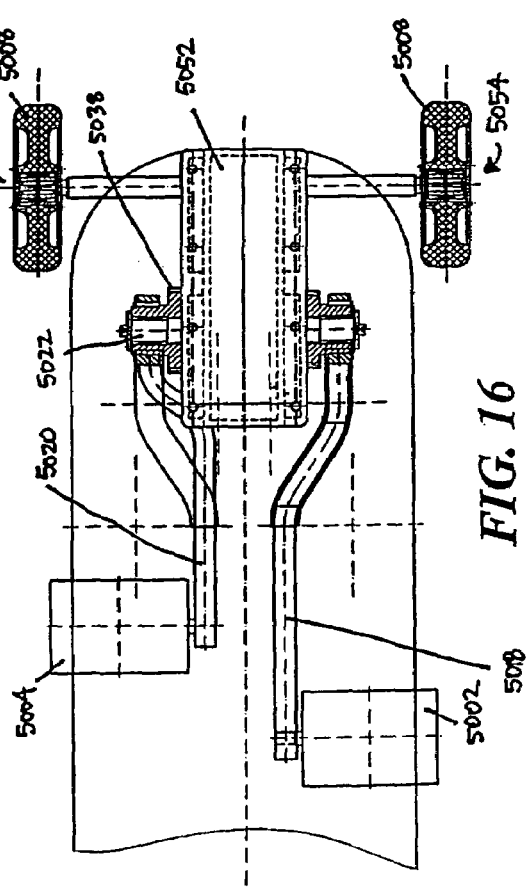
FIG. 15
FIG. 16
FIG. 17

USER-PROPELLED RIDING TOYS AND METHODS

RELATED APPLICATIONS

This application claims priority to U.S. Provisional No. 60/438,230, entitled "Self-Propelled Scooter with Quick Attachment Parts," filed on Jan. 6, 2003; U.S. Provisional No. 60/438,231, entitled "Self-Propelled Skateboard Without Pedal," filed on Jan. 6, 2003; and U.S. Provisional No. 60/440,101, entitled "Self-Propelled Scooter with Quick Attachment Parts," filed on Jan. 16, 2003, all of which are incorporated by reference.

FIELD OF THE INVENTION

The invention relates generally to the field of sports, games, recreation, and particularly relates to user-propelled toy vehicles on which a user stands.

BACKGROUND OF THE INVENTION

Conventional toys such as skateboards and scooters require a user to propel the toy forward by using at least one foot along the ground to generate forward motion while keeping the other foot on the toy without touching the ground. Generally, at least one of the user's feet is positioned on the toy at approximately a right angle to the forward direction of travel by the toy. One foot on the toy steers the direction of the toy while the other foot engages the ground and pushes the toy to propel the user and toy forward.

The speed and direction of these toys can be changed by shifting the user's weight towards either of the lateral sides of the toy. Since a weight shift in a lateral direction does not directly aid in the toy's forward motion or propulsion, the lateral weight shift is an inefficient use of the user's energy. Next, the full power of the user's leg muscles cannot be achieved. For instance, when the user's leg contacts the ground, the user's leg applies a force against the ground. However, the force is applied to the ground when the end user's leg is at approximately a right angle. This is mechanically inefficient since the maximum forward power only lasts a relatively short time, at the end of each push. Further, the toy's forward motion tends to "skew" the user's body as the user leans laterally towards the sides of the toy to push in a backward direction against the ground with his or her foot.

These toys are inefficient and do not allow the user to attain relatively high speeds and accurate maneuvering. In some cases, the user becomes tired and has to stop to rest. In other cases, the user becomes disinterested and the user stops playing with the toy. Examples of these conventional toys are self-propelled scooters and skateboards. Pedal-based skateboards have numerous disadvantages including: (1) Such toys are inconvenient for users to manipulate the skateboards for jumping or turning, as curves can easily be negotiated and the skateboard easily handled only if use of the pedals is interrupted; (2) such toys are uncomfortable for the users using their feet to drive the skateboards; (3) such toys demand the use of pedals, and look "complicated" to operate and ride, and thus might not be as fun to use; and (4) such toys do not provide users the feeling of "surfing" during use of the toy on the ground.

Therefore, a need exists for improved user-propelled riding toys and methods.

SUMMARY OF THE INVENTION

This invention is a user-propelled riding toy. A platform on which a user stands is supported by a steering mechanism that transfers a directional force from the platform, and a geartrain mounts to one or more wheels. The geartrain is adapted to receive a downward force from the platform, and translate a portion of the downward force into a rotational force on the wheels. The geartrain also provides an upward return force acting on the platform, and translates a directional force into a lateral force acting on the wheels. The platform is propelled forward direction by the rotational force on the wheels. Lateral forces cause two sets of wheels to pivot in opposite directions, and thereby directionally steer the platform.

According to another aspect of the invention, a propulsion device includes a platform to support the user, wheels, and a hinge joint. The hinge joint transfers a downward force from the platform by pivoting downward in response to a downward force from the platform, and then pivoting upward in response to a return force. A geartrain is associated with the hinge joint and drives a set of wheels in one direction only.

According to yet another aspect of the invention, a scooter includes a frame, pedals adapted to support a user, wheels, and a geartrain mounted to the wheels. The geartrain is adapted to receive a downward force from the pedals, translate a portion of the downward force into a rotational force acting to rotate the wheels in one direction only, and provide an upward return force for the pedals.

Objects, features, and advantages of various embodiments of the invention include:

(1) Improved apparatuses and methods for propelling a toy, such as a skateboard or a scooter; and (2) Improved apparatuses and methods for directionally steering a toy, such as a skateboard or a scooter.

Other objects, features and advantages of various embodiments according to the invention are apparent from the other parts of this document.

BRIEF DESCRIPTION OF THE DRAWINGS

FIG. 5A is a bottom schematic view of the apparatus shown in FIG. 1, with the wheels oriented for moving the apparatus in a forward direction.

FIG. 5B is another bottom view of the apparatus shown in FIG. 1, with the wheels oriented for turning the direction of the apparatus.

FIG. 15 is a side sectional view of a transmission assembly for the apparatus shown in FIG. 14.

FIG. 16 is an overhead sectional view of the transmission assembly for the apparatus shown in FIG. 14.

FIG. 17 is a cross sectional view of the transmission assembly for the apparatus shown in FIG. 14.

DETAILED DESCRIPTION OF SPECIFIC EMBODIMENTS

The present invention relates to user-propelled toy such as a skateboard or scooter, which utilizes power generated by movement of a user supported by a platform while keeping both feet on the platform without touching the ground. While the embodiments shown in the embodiments relate to skateboards and scooters, one skilled in the art will recognize the applicability of the invention to other toys, vehicles, and/or platforms that can support a user.

Figure 1:
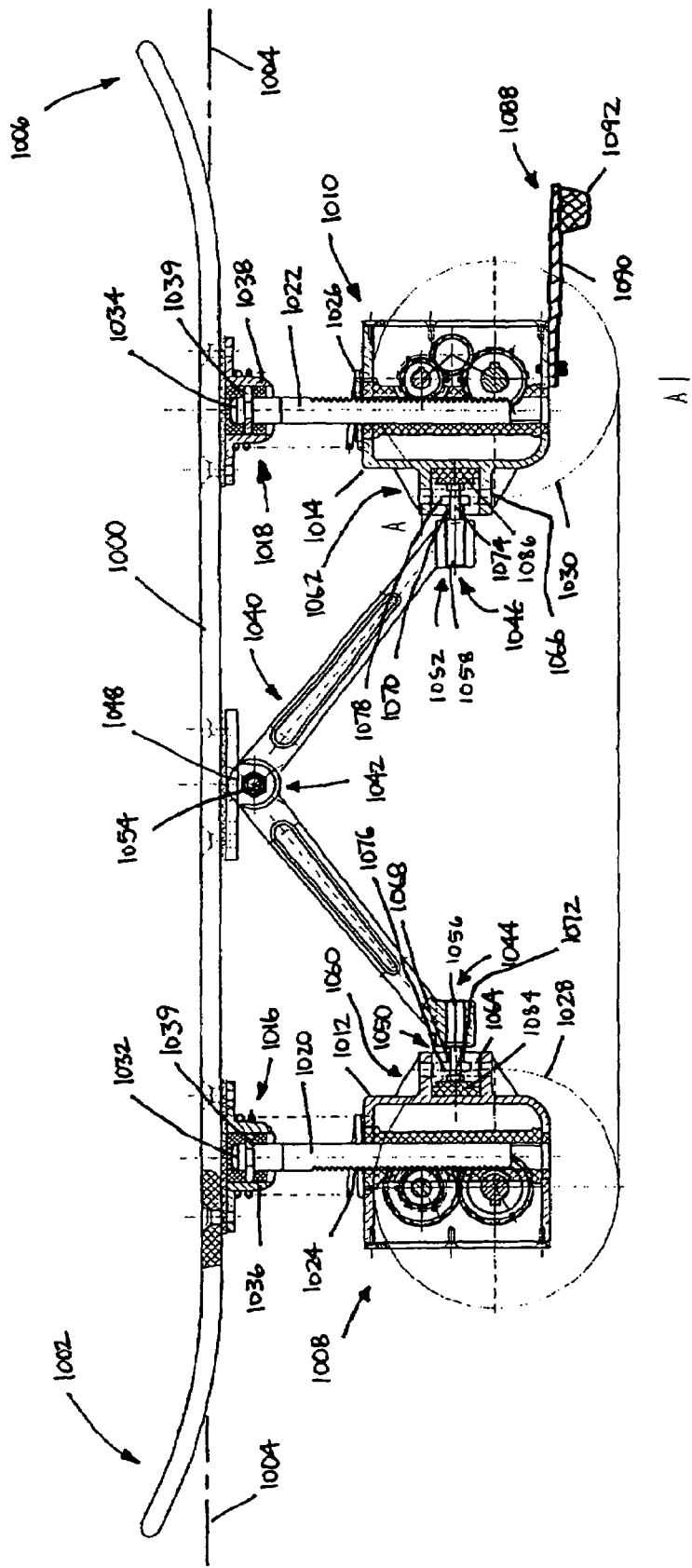
FIG. 1 is a side sectional view of an exemplary embodiment of an apparatus in accordance with the invention.
Figure 2:
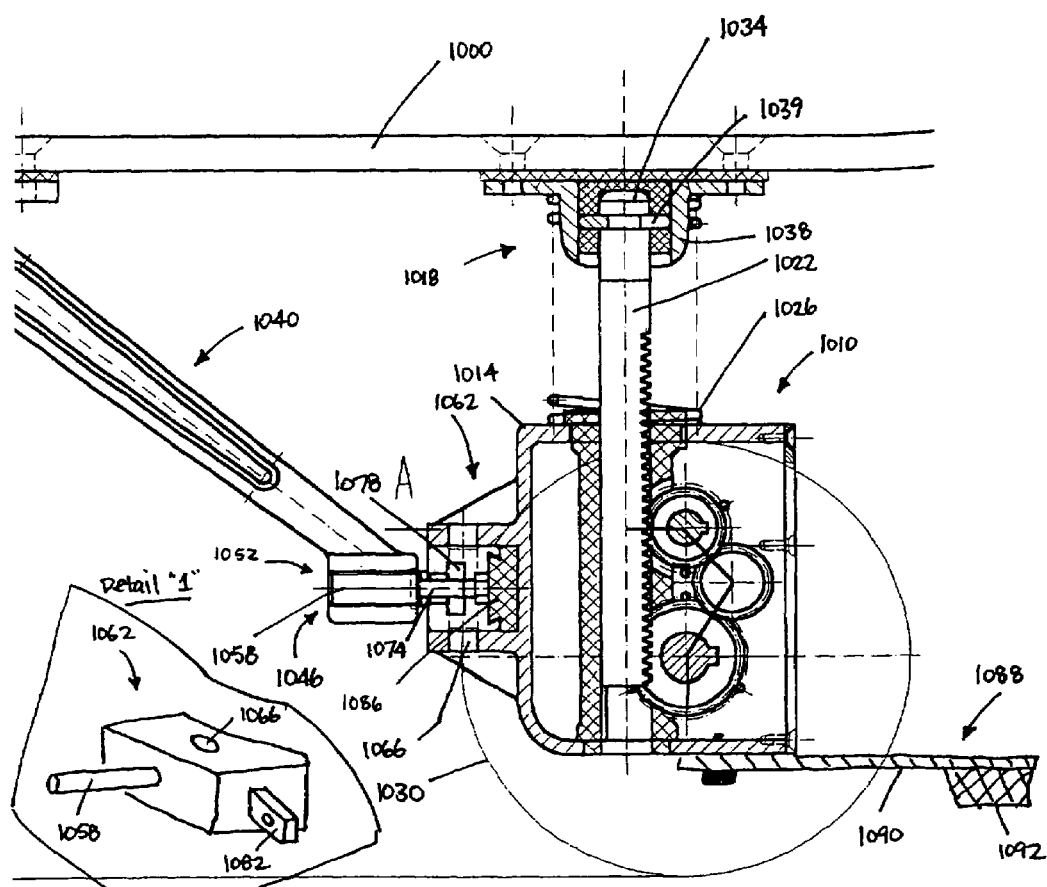
FIG. 2 is a detail view A—A of a transmission assembly of the apparatus shown in FIG. 1.

FIGS. 1, 2, 3, 4, and 5A–B illustrate an exemplary embodiment of an apparatus in accordance with the invention. FIG. 1 is a side view of the exemplary embodiment of the apparatus. FIG. 2 is a detail view A—A of a rear transmission assembly of the apparatus shown in FIG. 1. The footboard 1000 is adapted to support a user on an upper surface. The footboard 1000 shown is similar to a footboard of a conventional skateboard. Typically, the footboard 1000 is positioned in a substantially horizontal orientation. In this example, the footboard 1000 is shown with a leading edge 1002 that arcs slightly upward from a longitudinal axis 1004, and a trailing edge 1006 that also arcs slightly upward from the longitudinal axis 1004. The configurations of the leading edge 1002 and trailing edge 1006 assist a user with directional control and/or braking of the apparatus. Other apparatuses can have footboards with other configurations in accordance with the invention.

The apparatus shown also includes two geartrains or transmission assemblies 1008, 1010 adapted to translate a downward force from the footboard 1000 to a rotational force. Greater or fewer numbers of geartrains or transmission assemblies can be used in accordance with the invention. As shown in FIG. 1, each of the transmission assemblies 1008, 1010 includes a respective casing 1012, 1014, hinge joint 1016, 1018, rack 1020, 1022, helical compression spring 1024, 1026, and a set of wheels 1028, 1030. The casings 1012, 1014 each house a series of gears (shown in FIGS. 3 and 4) that translate the vertical movement of the racks 1020, 1022 to respective rotations of the sets of wheels 1028, 1030. The hinge joints 1016, 1018 are each adapted to transfer force between the footboard 1000 and the respective racks 1020, 1022 and are further adapted to mount the transmission assemblies 1008, 1010 to the lower surface of the footboard 1000. The racks 1020, 1022 each extend vertically upward from the respective casings 1012, 1014 towards the lower surface of the footboard 1000, and each rack 1020, 1022 rotates at least one gear inside the respective casing 1012, 1014. An upper end of each rack 1020, 1022 includes a respective head 1032, 1034 that travels vertically with respect to a respective mounting cup or hinge joint mount 1036, 1038. In the embodiment shown, the heads 1032, 1034 are retained within the hinge joint mounts 1036, 1038 by a U-shaped key 1039 that mounts to a corresponding slot in each respective rack 1020, 1022. The mounting cups or hinge joint mounts 1036, 1038 connect to the lower surface of the footboard 1000, and control the vertical and lateral travel of the heads 1032, 1034. The hinge joint mounts 1036, 1038 permit the heads 1032, 1034 to pivot and slide laterally as well as travel vertically within the hinge joint mounts 1036, 1038. The vertical and lateral travel of the heads 1032, 1034 provide a range and degree of freedom for the racks 1020, 1022 to move during driving and turning of the apparatus. The mounting cups or hinge joint mounts 1036, 1038 can include a cushioning material such as a rubber sock to minimize metal-to-metal contact between the heads 1032, 1034 and the interiors of the mounting cups or hinge joint mounts 1036, 1038. The helical compression springs 1024, 1026 each mount circumferentially around a portion of the respective rack 1020, 1022 extending between the footboard 1000 and the casings 1012, 1014 such that an end of each spring 1024, 1026 is adjacent to the lower surface of the footboard 1000 or respective hinge joint mount 1036, 1038, and an opposing end of the springs 1024, 1026 is adjacent to the upper surface of the respective casing 1012, 1014. Both helical compression springs 1024, 1026 are preloaded. The springs 1024, 1026 can then be further loaded by applying a downward force to the footboard 1000, such as a user standing on the upper surface of the footboard 1000.

Note that the geartrains described and shown are by example only, and other configurations and devices can be utilized in accordance with various embodiments of the invention. Examples of a geartrain can include, but is not limited, chain type-drives, band type-drives, hydraulic-type drives, or other gear drives that translate a downward force into a rotational force.

A steering support 1040 is adapted to transfer a directional force from the footboard 1000 to at least one of the transmission assemblies 1008, 1010. The steering support 1040 is V-shaped with a central hinge hole 1042, and end hinge holes 1044, 1046 adjacent to the ends of the support 1040. The steering support 1040 mounts to the lower surface of footboard 1000 via a support mounting frame or support linkage 1048. Respective transmission linkages 1050, 1052 mount to opposing ends of the steering support 1040. The central hinge hole 1042 is sized to receive a hinge 1054 adapted to connect the steering support 1040 to the support mounting frame or support linkage 1048, and each of the end hinge holes 1044, 1046 are sized to receive respective hinges 1056, 1058 connecting the ends of the steering support 1040 to the respective transmission linkages 1050, 1052. Note that in this embodiment, the hinges 1054, 1056, 1058 shown are bolt shaped.

Each geartrain 1008, 1010 also includes a respective steering linkage 1060, 1062. Each of the steering linkages 1060, 1062 connect with a respective transmission linkage 1050, 1052 and the steering support 1040. The steering linkages 1060, 1062 include a vertical hinge hole 1064, 1066 and a horizontal hinge hole 1068, 1070. Respective hinges 1056, 1058 connect through the horizontal hinge holes 1068, 1070 to connect the transmission linkages 1050, 1052 and the steering support 1040 to the steering linkages 1060, 1062. Other hinges 1072, 1074 connect through the vertical hinge holes 1064, 1066 to connect the steering linkages 1060, 1062 to a respective geartrain 1008, 1010.

The steering support 1040, transmission linkages 1050, 1052, and steering linkages 1060, 1062 are shown by way of example only, and other configurations or devices can be used in accordance with various embodiments of the invention.

The support linkage 1048 and corresponding hinge 1054 permit the steering support 1040 to pivot about the hinge 1054 along the longitudinal axis 1004 of the footboard 1000. Likewise, the transmission linkages 1050, 1052, corresponding hinges 1056, 1058, steering linkages 1060, 1062, and corresponding hinges 1072, 1074 permit the transmission assemblies 1008, 1010 to pivot along a vertical and horizontal axis with respect to the steering support 1040.

A set of adjustment bolts 1076, 1078 mount to each respective steering linkage 1060, 1062, and provide control adjustments for each steering linkage 1060, 1062. Each set of adjustment bolts 1076, 1078 includes a pair of bolts positioned parallel to and on opposing sides of the hinges 1056, 1058, and through a set of stops 1080, 1082 mounted to the steering linkages 1060, 1062. The sets of adjustment bolts 1076, 1078 permit selective control of the range of pivoting motion of the transmission assemblies 1008, 1010 with respect to the steering support 1040. When greater turning control of the apparatus is desired, either or both sets of adjustment bolts 1076, 1078 can be loosened. Loosening either or both sets of adjustment bolts 1076, 1078 provides a greater range of movement or freedom for the respective hinges 1072, 1074 to move with respect to the transmission assemblies 1008, 1010. Likewise, when less turning control of the apparatus is desired, either or both sets of adjustment bolts 1076, 1078 can be tightened. Tightening either or both sets of adjustment bolts 1076, 1078 provides a lesser range of movement or freedom for the respective hinges 1072, 1074 to move with respect to the transmission assemblies 1008, 1010.

An example of a steering linkage is shown in greater detail in Detail "1" of FIG. 2. As shown, a steering linkage 1062 includes a horizontally positioned hinge 1058 that connects to the steering support 1040, and a vertically positioned hinge 1066 that connects to the casing 1014. A stop 1082 on a lateral side of the steering linkage 1062 provides a bolt hole for receiving an adjustment bolt 1078.

Referring back to FIGS. 1 and 2 for the embodiment shown, a cushioned stop 1084, 1086 is positioned between each set of adjustment bolts 1076, 1078 and the exterior surface of each respective casing 1012, 1014. The cushioned stops 1084, 1086 provide a contact surface for the sets of adjustment bolts 1076, 1078 as each transmission assembly 1008, 1010 pivots with respect to the steering support 1040, thus providing improved and smoother steering control for the apparatus.

Also shown in this embodiment, a brake 1088 mounts to the lower portion of the rear casing 1014. The brake 1088 shown is a relatively flat strip 1090 mounted to and extending from the lower portion of the rear casing 1014. At the extended end of the flat strip 1090, a rubber brake pad 1092 mounts to the lower portion of the flat strip 1090 adjacent to the ground. When a user desires to apply the brake 1088, a downward force is applied to the rear portion of the platform 1000 adjacent to the trailing edge 1006. The brake pad 1092 contacts the ground and creates a frictional resistance against the ground, thus slowing the forward velocity of the apparatus. A brake can also mount to either or both geartrains 1008, 1010 or to a set of wheels 1028, 1030. Those skilled in the art will recognize the type of brake that can be utilized in accordance with the invention.

Figure 3:
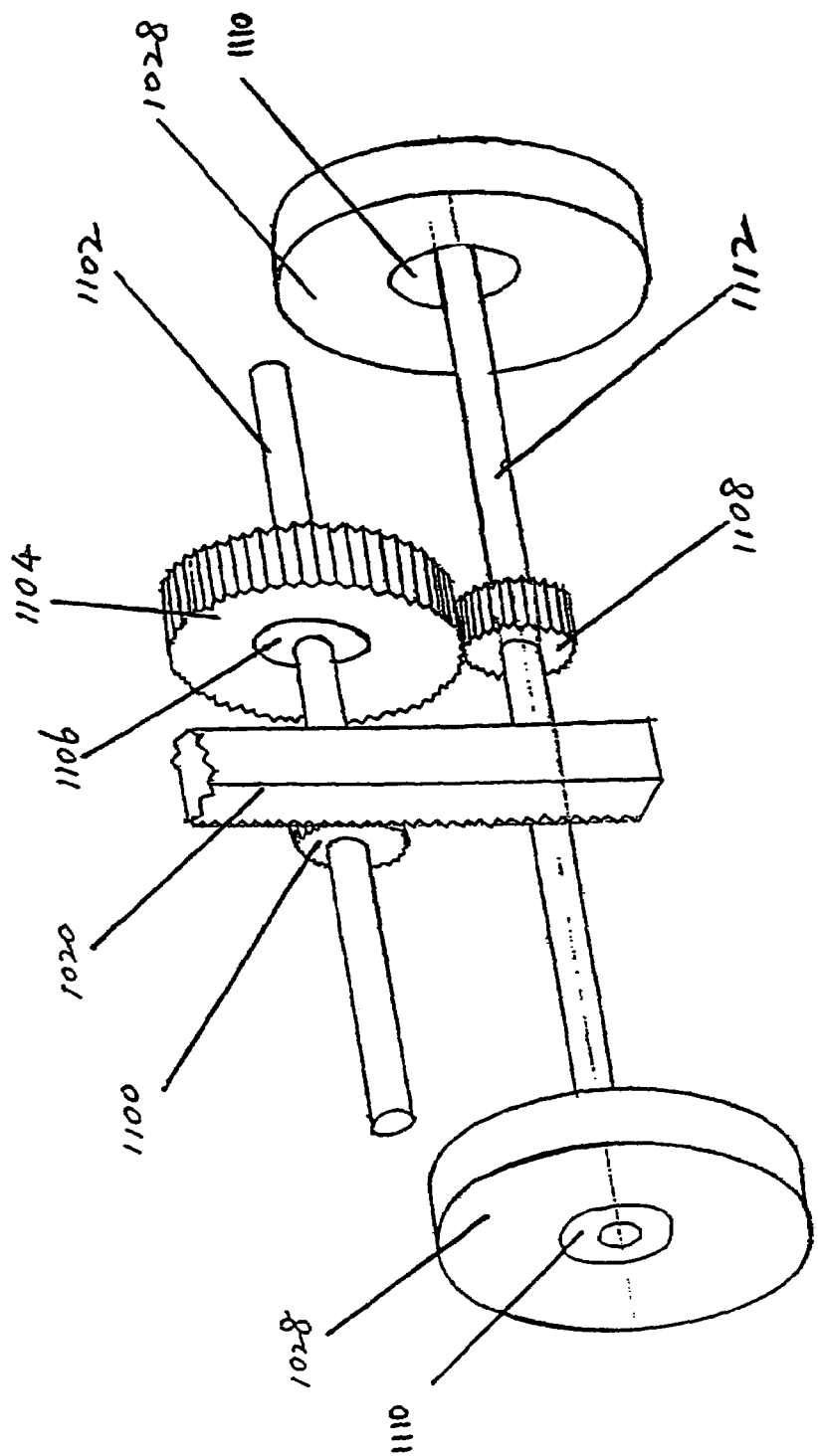
FIG. 3 is a perspective view of a transmission assembly for the apparatus shown in FIG. 1.

FIG. 3 illustrates a perspective view of a set of gears for the front transmission assembly of the apparatus shown in FIG. 1. FIG. 3 shows the rack 1020 engaged with rack gear 1100. The rack gear 1100 mounts to a shaft 1102. A second gear 1104 mounts to the shaft 1102 with a first one-way clutch or first overrunning clutch 1106. The first overrunning clutch 1106 engages the shaft 1102 when the rack 1020 moves in a downward direction. When the rack 1020 moves in an upward direction, the shaft 1102 rotates freely without engaging the second gear 1104. A third gear 1108 mounts to a corresponding axle 1112 with the set of wheels 1028. The set of wheels 1028 mounts to the axle 1112 by way of a second one-way clutch or overrunning clutch 1110 in each wheel. Note that the shaft 1102 and axle 1112 are supported by the casing 1012. The set of wheels 1028 mounts to the axle 1112, with one wheel positioned at each end of the axle 1112. Conventional bearings for rotation of the shaft 1102, axle 1112, and set of wheels 1028 are used. The third gear 1108 engages the second gear 1104 such that the axle 1112 drives the set of wheels 1028 when the axle 1112 rotates faster than the wheels 1028. Thus, when the apparatus moves in a forward direction, the set of wheels rotates in a clockwise direction. When the rotational speed of axle 1112 is slower than that of the set of wheels 1028, the second one-way clutch or overrunning clutch 1110 in each wheel permits the wheels to rotate faster than the axle 1112, also known as a "freewheeling condition." When the apparatus attempts to move in a rearward or backward direction, both the front rack 1020 and rear rack 1022 move upward at the same time, preventing the apparatus from moving in a rearward or backward direction.

In the embodiment shown, the total number of shafts can be greater or fewer. In FIG. 1, the front transmission assembly 1008 has two shafts 1102, 1112, while the rear transmission assembly 1010 has three shafts (shown in FIG. 4 as 1202, 1210 and 1216). Those skilled in the art will recognize that other configurations of gears, shafts, one-way or overrunning clutches, or other devices can be used in accordance with the invention.

Figure 4:
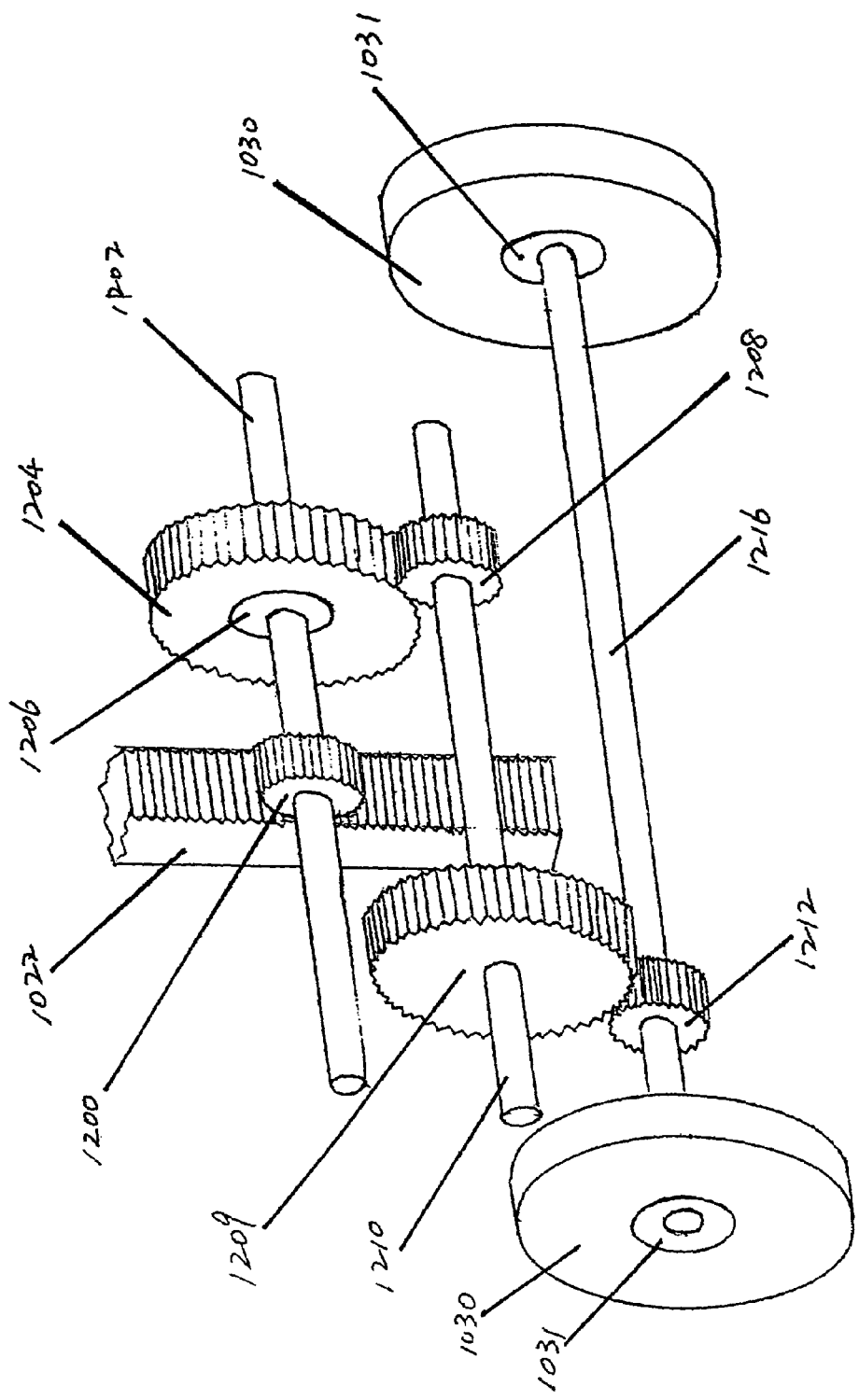
FIG. 4 is a perspective view of another transmission assembly for the apparatus shown in FIG. 1.

FIG. 4 illustrates a perspective view of a set of gears for the rear transmission assembly of the apparatus shown in FIG. 1. FIG. 4 shows the rack 1022 engaged with rack gear 1200. The rack gear 1200 mounts to a shaft 1202. A second gear 1204 mounts to the shaft 1202. The second gear 1204 mounts the shaft 1202 with a first one-way clutch or first overrunning clutch 1206. The first overrunning clutch 1206 is set in a similar driving direction as the rack gear 1200 so that downward movements of the rack 1022 rotate the shaft 1202 in a clockwise direction. A third gear 1208 mounts to an intermediate shaft 1210. The third gear 1208 engages the second gear 1204, and receives force from the second gear 1204. In turn, the third gear 1208 transfers the force to the intermediate shaft 1210. A fourth gear 1209 mounts to the intermediate shaft 1210, and engages a fifth gear 1212 mounted to an axle 1216. The fourth gear 1209 engages the fifth gear 1212, and transfers force from the intermediate shaft 1210 to the fifth gear 1212. In turn, the fifth gear 1212 transfers force from the fourth gear 1209 to the axle 1216. A set of wheels 1030 mounts to the axle 1216 via a second one-way or overrunning clutch 1031 in each wheel. Note that the shafts 1202, 1210 and axle 1216 are supported by the casing 1014. The set of wheels 1030 mounts to the axle 1216, with one wheel positioned at each end of the axle 1216. Conventional bearings for rotation of the shafts 1202, 1210, axle 1216, and set of wheels 1030 are used.

When the axle 1216 rotates faster than the set of wheels 1030, the downward movement of the rack 1022 drives the apparatus forward. When the rack 1022 moves in an upward direction, the first one-way or overrunning clutch 1206 permits the shaft 1202 to rotate freely without engaging the second gear 1204. Those skilled in the art will recognize that other configurations of gears, shafts, one-way or overrunning clutches, or other devices can be used in accordance with the invention.

As previously described above, each of the springs 1024, 1026 has been previously compressed when positioned between the footboard 1000 and the respective transmission assemblies 1008, 1010. When a user stands on the footboard 1000, a downward force on the footboard 1000 is generated. To initiate forward movement and to increase the forward velocity of the apparatus shown, the user applies alternate and repetitive downward forces on the front portion and rear portion of the footboard 1000. The user can generate increased downward force on either the front or rear portion of the footboard 1000 by adjusting his or her body weight over the corresponding portion of the footboard 1000. The downward forces generated by the shifting of the user's body weight over the footboard 1000 further compress both helical compression springs 1024, 1026. The springs 1024, 1026 store a portion of the downward forces as compression energy for a subsequent return or upward force on the footboard 1000. The downward forces also drive the respective racks 1020, 1022 towards the corresponding series of gears and transmission assemblies 1008, 1010. As described previously, the transmission assemblies 1008, 1010 translate the downward forces to respective moments upon each axle 1112, 1216, thus rotating the sets of wheels 1028, 1030 to move the apparatus in a forward direction. The stored compression energy of the springs 1024, 1026 combined with the user's shifting body weight to an opposing foot on the platform 1000 causes the racks 1020, 1022 to move in an upward or "return" direction, away from the series of gears and transmission assemblies. Thus, repetitively applying a downward force to the front portion of the footboard 1000 and alternately applying a downward force to the rear portion of the footboard 1000 drives the apparatus in a forward direction with increasing velocity.

For directional steering of the apparatus, such as making a turn, the footboard 1000 tilts in either lateral direction. While standing on the footboard 1000, a user initiates a turn by shifting his or her body weight in a lateral direction depending on the desired direction of the turn. As the user shifts his or her body weight, the footboard 1000 tilts in a desired lateral direction. By shifting his or her body weight in a lateral direction, the user generates a lateral force on the footboard 1000. The steering support 1040 transfers the lateral force from the footboard 1000 to one or both of the transmission assemblies 1008, 1010. The hinge 1054 at the support linkage 1048 permits the steering support 1040 to pivot in a forward and rearward direction along a longitudinal axis of the footboard 1000. Respective transmission linkages 1050, 1052 mount to opposing ends of the steering support 1040 via the steering linkages 1060, 1062. Respective hinges 1056, 1058 connect through the horizontal hinge holes 1068, 1070 to connect the transmission linkages 1050, 1052 of the steering support 1040 to the steering linkages 1060, 1062. Other hinges 1072, 1074 connect through the vertical hinge holes 1064, 1066 to connect the steering linkages 1060, 1062 to the respective geartrain 1008, 1010. The transmission linkages 1050, 1052, corresponding hinges 1056, 1058, steering linkages 1060, 1062, and corresponding hinges 1072, 1074 permit the transmission assemblies 1008, 1010 to pivot along a vertical and horizontal axis with respect to the steering support 1040. Cooperation between the steering support 1040, transmission linkages 1050, 1052, and steering linkages 1060, 1062, and hinge joints 1016, 1018 permit a user to directionally steer the apparatus.

Greater or lesser turning control of the apparatus can be attained by tightening or loosening the adjustment bolts 1076, 1078 to permit greater or lesser range or freedom of pivoting movement of the transmission assemblies 1008, 1010 with respect to the steering support 1040.

FIGS. 5A and 5B illustrate the operation of a steering support for the apparatus shown in FIG. 1. FIG. 5A is a bottom schematic view of the apparatus shown in FIG. 1, with the wheels oriented for moving the apparatus in a forward direction. FIG. 5B is another bottom view of the apparatus shown in FIG. 1, with the wheels oriented for turning the direction of the apparatus. Note that the illustrations shown are schematic views illustrating operation of the apparatus shown in FIG. 1. As shown in FIG. 5A, the steering support 1040 is in a substantially straight orientation with respect to the front transmission assembly 1008 and rear transmission assembly 1010. The set of wheels 1028 for the front transmission assembly 1008 is in a similar orientation as the set of wheels 1030 for the rear transmission assembly 1010. In the orientation shown, the apparatus can travel in a relatively straight direction, such as a substantially forward direction 1400 direction.

When the user initiates a turn with the apparatus, the user applies a lateral force 1404 to the footboard 1000 as shown in FIG. 5A. Then, as shown in FIG. 5B, the footboard 1000 transfers the lateral force to the steering support 1040, and the steering support 1040 translates the lateral force to the transmission assemblies 1008, 1010. The steering support 1040 is adapted to pivot about hinge 1054 at the support linkage 1048 so that the steering support 1040 can pivot in both lateral directions 1406, 1408. Note that in response to other forces on the footboard 1000, the steering support 1040 can also pivot about the hinge 1054 at the support linkage 1048 in the forward 1400 and/or rearward directions 1402. In this example, a front portion 1410 of the steering support 1040 pivots in a lateral direction 1406 counter to the lateral direction 1408 of the pivot of the rear portion 1412 of the steering support 1040. Respective transmission linkages 1050, 1052 and hinges 1056, 1058 mounted at opposing ends of the steering support 1040 permit the front transmission assembly 1008 and set of wheels 1028 to pivot in a lateral direction counter to the lateral direction of the pivot of the rear transmission assembly 1010 and set of wheels 1030. Therefore, the front set of wheels 1028 and rear set of wheels 1030 turn in opposing directions to provide improved directional steering control of the apparatus as shown.

In other embodiments of the invention, greater or fewer numbers of wheels can be used. For example, a two-wheeled platform could operate in a similar manner as described above, with at least one wheel capable of pivoting to provide directional steering control.

Figure 6:
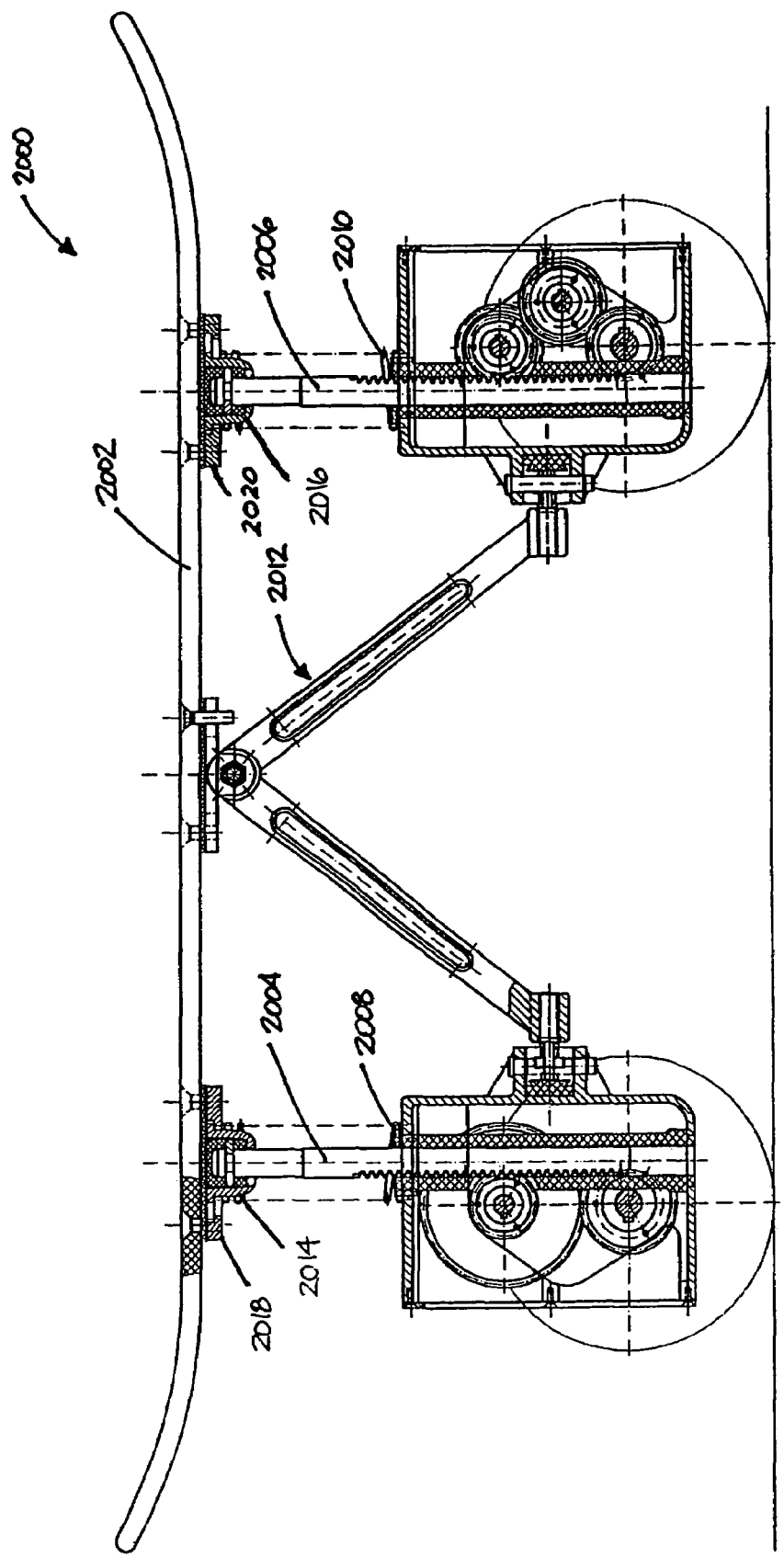
FIG. 6 is a side sectional view of a second embodiment of an apparatus in accordance with the invention.

FIG. 6 is a side view of a second embodiment of an apparatus in accordance with the invention. The apparatus 2000 shown in this embodiment is similar to the apparatus shown in FIGS. 1–5, except the apparatus 2000 shown is adapted for relatively greater drive distance and downward forces upon the footboard 2002, such as the body weight of an adult standing on the footboard 2002. Racks 2004, 2006, springs 2008, 2010, and steering support 2012 are also adapted to account for the relatively greater downward forces upon the footboard 2002. For example, racks 2004, 2006 are relatively longer than the racks shown in FIG. 1. Accordingly, springs 2008, 2010 have an increased length, and steering support 2012 is relatively longer. Furthermore, a greater range of movement of the racks 2004, 2006 along the longitudinal axis of the apparatus 2000 may be needed to account for the longer length of the racks 2004, 2006, therefore, the rack cups 2014, 2016 are adapted to slide back and forth with respect to the respective hinge joint mount 2018, 2020. Geartrains or transmission assemblies 2014, 2016 are substantially similar to those shown as 1008, 1010 in FIG. 1. Note that the geartrains shown are by example only, and other configurations and devices can be utilized in accordance with various embodiments of the invention. A geartrain can include, but is not limited, chain type-drives, band type-drives, hydraulic-type drives, or other gear drives that translate a downward force into a rotational force. The embodiment shown operates in a similar manner as the embodiment shown and described in FIGS. 1–4, and 5A–5B. Those skilled in the art will recognize that other sizes and configurations of the various components can be used in accordance with the invention.

Figure 7:
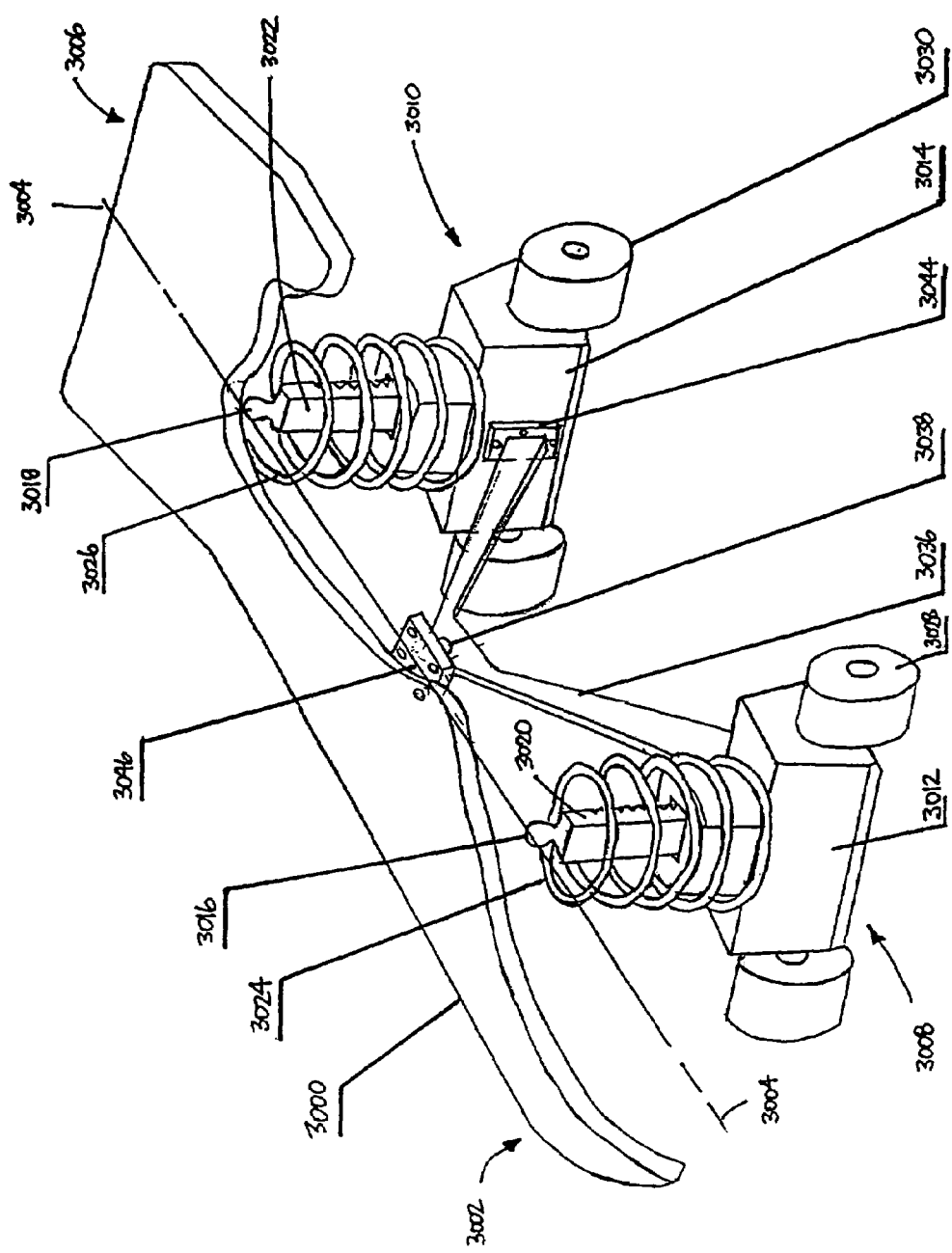
FIG. 7 is a perspective view of a third embodiment of an apparatus in accordance with the invention, with a portion of the footboard cutaway to show the underlying transmission assembly and support.

FIG. 7 is a perspective view of a third embodiment of an apparatus in accordance with the invention, with a portion of a footboard cutaway to show the underlying geartrain and support. The apparatus includes a footboard 3000 adapted to support a user on an upper surface. The footboard 3000 shown is similar to a footboard of a conventional skateboard. Typically, the footboard 3000 is positioned in a substantially horizontal orientation. In this example, the footboard 3000 is shown with a leading edge 3002 that arcs slightly downward from a horizontal axis 3004, and a trailing edge 3006 that arcs slightly upward from the horizontal axis 3004. The configurations of the leading edge 3002 and trailing edge 3006 assist a user with directional control and/or braking of the apparatus. Other apparatuses can have footboards with other configurations in accordance with the invention.

The apparatus also includes at least two geartrains or transmission assemblies 3008, 3010 adapted to translate a downward force from the footboard 3000 to a rotational force. Each of the transmission assemblies 3008, 3010 includes a respective casing 3012, 3014 hinge joint 3016, 3018, rack 3020, 3022, helical compression spring 3024, 3026, and a set of wheels 3028, 3030. The casings 3012, 3014 each house a series of gears (similar to those shown and described in FIGS. 3 and 4) that translate the vertical movement of the racks 3020, 3022 to respective rotations of the sets of wheels 3028, 3030. The hinge joints 3016, 3018 are each adapted to transfer force between the footboard 3000 and the respective racks 3020, 3022 and further adapted to mount the transmission assemblies 3008, 3010 to the lower surface of the footboard 3000. The racks 3020, 3022 each extend vertically upward from the respective casings 3012, 3014 towards the lower surface of the footboard 3000, and each rack 3020, 3022 contacts at least one gear inside the respective casing 3012, 3014.

Note that the geartrains shown are by example only, and other configurations and devices for propelling a platform can be utilized in accordance with various embodiments of the invention. Examples of a geartrain can include, but are not limited to, chain type-drives, band type-drives, hydraulic-type drives, or other gear drives that translate a downward force into a rotational force.

Figure 8:
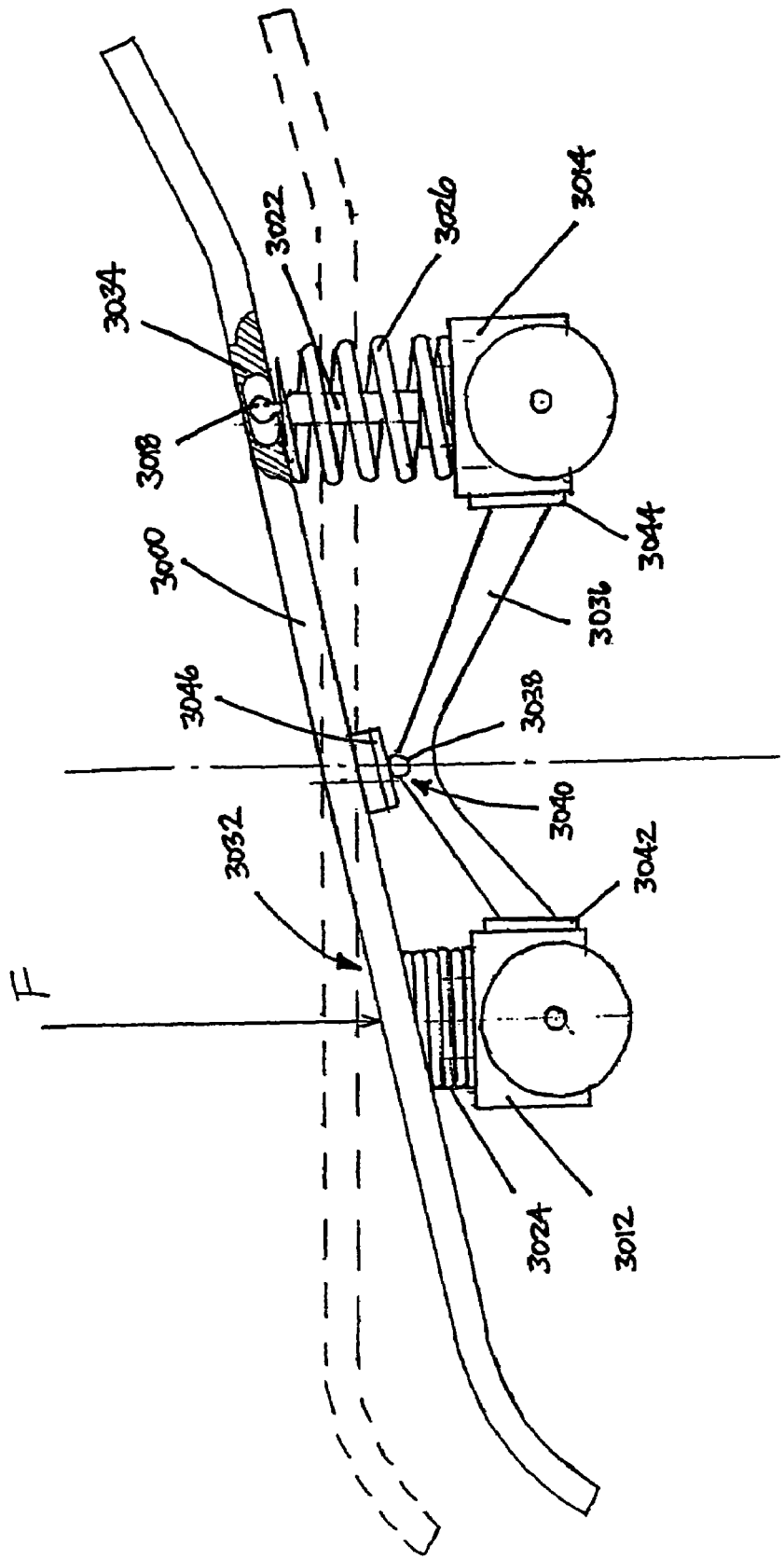
FIG. 8 is a side view of the apparatus shown in FIG. 7 with a downward force being applied to the front portion of the apparatus.

FIG. 8 is a side view of the embodiment shown in FIG. 7. As shown in FIG. 8, a respective hinge joint mount 3032, 3034 receives each hinge joint 3016, 3018. The hinge joint mounts 3032, 3034 each connect to the lower surface of the footboard 3000 to control the movement of the hinge joint 3016, 3018. The helical compression springs 3024, 3026 each mount circumferentially around a portion of the respective rack 3020, 3022 extending between the footboard 3000 and the casings 3012, 3014 such that an end of each spring 3024, 3026 is adjacent to the lower surface of the footboard 3000 or hinge joint mount 3032, 3034, and an opposing end of the springs 3024, 3026 is adjacent to the upper surface of the casings 3012, 3014. Both helical compression springs 3024, 3026 are preloaded by adjusting the distance between the footboard 3000 and the casings 3012, 3014. The springs 3024, 3026 can then be further loaded by applying a downward force to the footboard 3000, such as a user standing on the upper surface of the footboard 3000.

Referring to FIG. 7, a steering support 3036 is adapted to transfer a directional force from the footboard 3000 to at least one of the transmission assemblies 3008, 3010. The steering support 3036 shown is similar to the steering support shown in FIG. 1, however, the steering support 3036 shown includes a centrally located hinge 3038 and no hinges at the ends of the steering support 3036. Rather, the steering support 3036 is V-shaped with a central hinge hole 3040, and includes end hinge mounts 3042, 3044 adjacent to the ends of the support 3036. The steering support 3036 mounts to the lower surface of footboard 3000 via a support linkage 3046. The support linkage 3046 can include a rubber or cushioning pad between the linkage 3046 and the footboard 3000 to provide additional flexibility. The central hinge hole 3040 is sized to receive the hinge 3038 adapted to connect the steering support 3036 to the support linkage 3046, and each of the end hinge mounts 3042, 3044 connect the ends of the steering support 3036 to the respective transmission assemblies 3008, 3010. The end hinge mounts 3042, 3044 can each include a rubber or cushioning pads between the mounts 3042, 3044 and the respective transmission assemblies 3008, 3010 to provide additional flexibility.

As shown in FIG. 8, the support linkage 3046 and corresponding hinge 3038 permit the footboard 3000 to pivot with respect to the steering support 13036. Likewise, the support linkage 3046 and corresponding hinge 3038 also permit the footboard 3000 to pivot with respect to the transmission assemblies 3008, 3010. For example, when a downward force 3100 is applied to a front portion 3102 of the footboard 3000, the front portion 3102 of the footboard 3000 pivots downward while the rear portion 3104 of the footboard 3000 pivots about the hinge 3038 in an opposing and upward direction 3106. Likewise, if a downward force is applied to the rear portion 3104 of the footboard 3000, then the front portion 3102 of the footboard 3000 pivots about the hinge 3038 in an opposing and upward direction 3106. An optional brake (not shown) can be mounted to either of the geartrains 3008, 3010, casings 3012, 3014, or set of wheels 3028, 3030. Those skilled in the art will recognize the type of brake that can be utilized in accordance with the invention. The embodiment shown in FIGS. 7 and 8 operates similarly to the embodiments shown in FIGS. 1–6.

Figure 9:
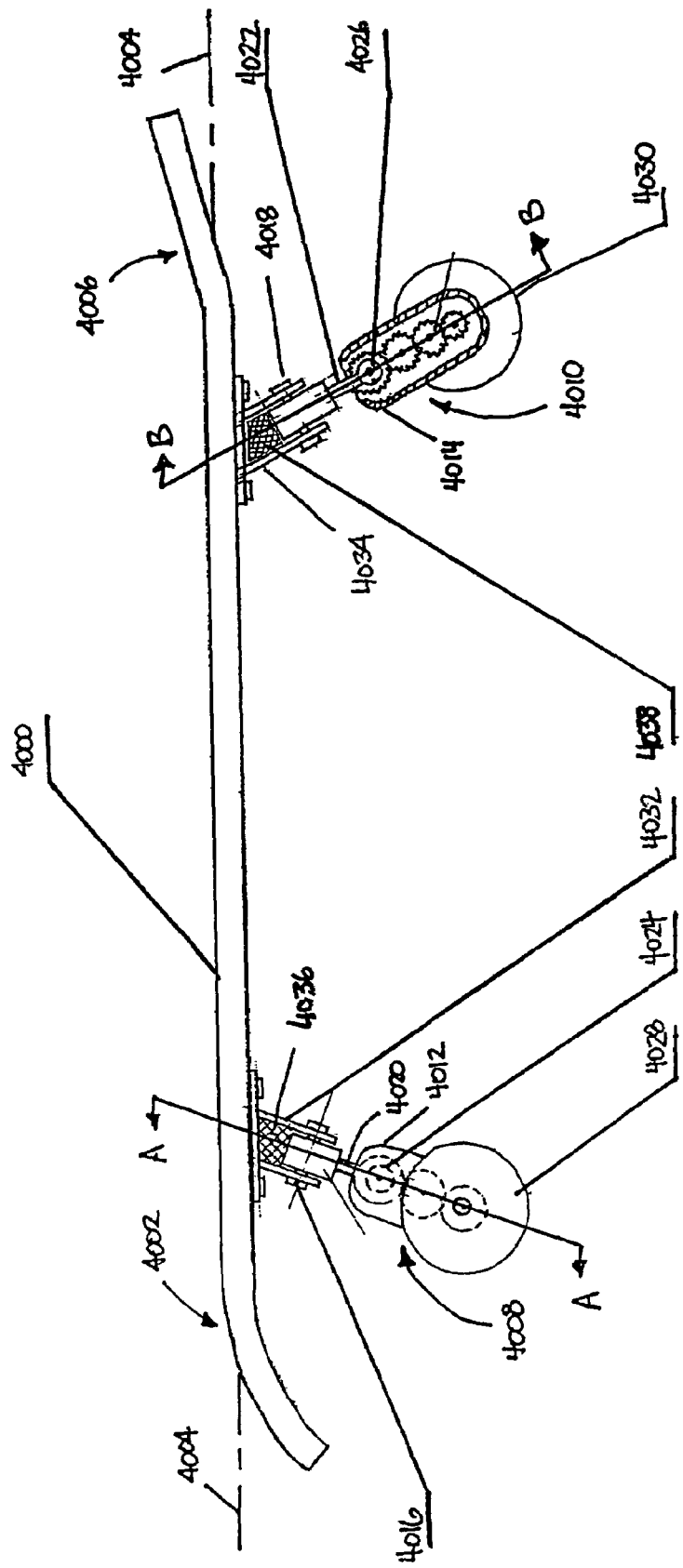
FIG. 9 is a side view of a fourth embodiment of an apparatus in accordance with the invention.

FIG. 9 is a side view of a fourth embodiment of an apparatus in accordance with the invention. The footboard 4000 is adapted to support a user on an upper surface. The footboard 4000 shown is similar to a footboard of a conventional skateboard. Typically, the footboard 4000 is positioned in a substantially horizontal orientation. In this example, the footboard 4000 is shown with a leading edge 4002 that arcs slightly downward from a horizontal axis 4004, and a trailing edge 4006 that arcs slightly upward from the horizontal axis 4004. The configurations of the leading edge 4002 and trailing edge 4004 assist a user with directional control and/or braking of the apparatus. Other apparatuses can have footboards with other configurations in accordance with the invention.

The apparatus shown also includes two geartrains or transmission assemblies 4008, 4010 adapted to translate a downward force from the footboard 4000 to a rotational force. Greater or fewer numbers of geartrains or transmission assemblies can be used in accordance with the invention. Each of the transmission assemblies 4008, 4010 includes a respective casing 4012, 4014, hinge joint 4016, 4018, drive arm 4020, 4022, a torque spring 4024, 4026, and a set of wheels 4028, 4030. The casings 4012, 4014 each house a series of gears (shown in FIGS. 10 and 11) that translate rotation of the transmission assemblies 4008, 4010 to respective rotations of the sets of wheels 4028, 4030. The hinge joints 4016, 4018 are each adapted to transfer force between the footboard 4000 and the respective drive arms 4020, 4022, and are further adapted to mount the transmission assemblies 4008, 4010 to the lower surface of the footboard 4000. The drive arms 4020, 4022 each extend vertically upward from the respective casings 4012, 4014 towards the lower surface of the footboard 4000, and each drive arm 4020, 4022 rotates at least one shaft inside the respective casing 4012, 4014. Note that in the embodiment shown, the drive arms 4020, 4022 extend at a slight angle from the casings 4012, 4014 towards the lower surface of the footboard 4000. A respective arm mount frame 4032, 4034 receives one of the hinge joints 4016, 4018. The arm mount frames 4032, 4034 each connect to the lower surface of the footboard 4000 to control the movement of the hinge joints 4016, 4018, and to further control the directional steering of the apparatus. A compressible rubber material 4036, 4038 mounts within the arm mount frames 4032, 4034 and adjacent to each drive arm 4020, 4022. The torque springs 4024, 4026 each mount within the casings 4012, 4014 and work in conjunction with the series of gears shown in FIGS. 10 and 11. Both torque springs 4024, 4026 are preloaded by adjusting an initial starting angle of each spring. The torque springs 4024, 4026 can then be further loaded by applying a downward force to the footboard 4000, such as a user standing on the upper surface of the footboard 4000 and applying sufficient downward force to rotate the geartrains or transmission assemblies 4008, 4010.

Note that the geartrains shown are by example only, and other configurations and devices for propelling a platform can be utilized in accordance with various embodiments of the invention. Examples of a geartrain can include, but are not limited to, chain type-drives, band type-drives, hydraulic-type drives, or other gear drives that translate a downward force into a rotational force.

Figure 10:
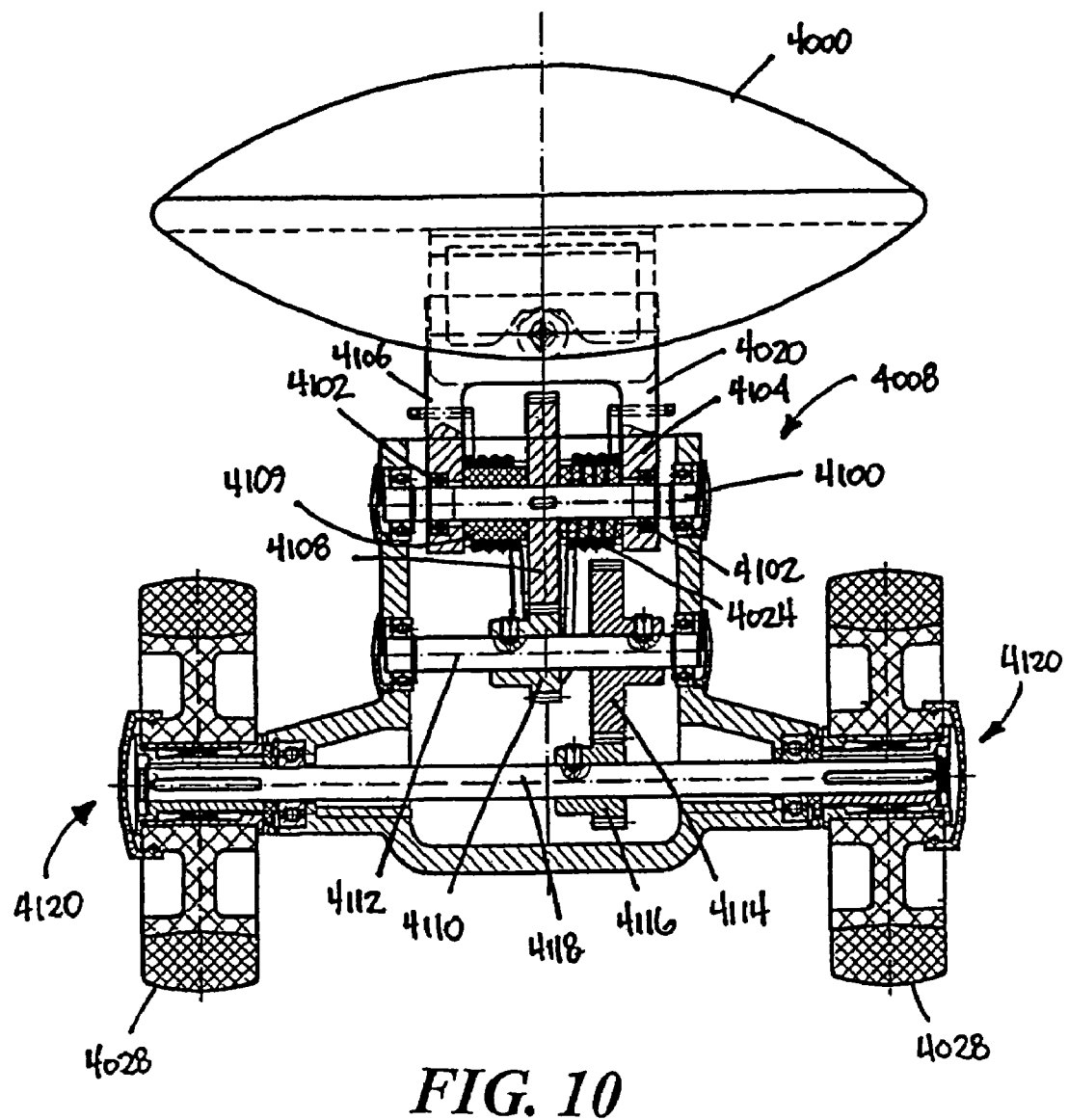
FIG. 10 is a front sectional view of the apparatus shown in FIG. 9.

FIG. 10 is a front detail view A—A of the apparatus shown in FIG. 9. This drawing illustrates the front transmission assembly 4008 in greater detail. FIG. 10 shows the drive arm 4020 and a series of gears. The drive arm 4020 mounts to a first shaft 4100 with a first one-way clutch or first overrunning clutch 4102. In the embodiment shown, the drive arm 4020 includes a pair of arms 4104, 4106 that engage the first shaft 4100 at intermediate portions of the shaft 4100. A first gear 4108 also mounts to the first shaft 4100 near the central portion of the shaft 4100. The first overrunning clutch 4102 is set in a similar driving direction as the first gear 4108 so that torque force of the drive arm 4020 rotates the shaft 4100 in a counterclockwise direction. Likewise, the first overrunning clutch 4102 permits the first gear 4108 to rotate in a counterclockwise direction when the transmission assembly 4008 rotates around the shaft 4100.

Torque spring 4024 also mounts to the shaft 4100 with a compressible material 4109 positioned between the torque spring 4024 and the shaft 4100. The torque spring and compressible material 4109 are adapted to provide a "return" force on the transmission assembly 4008. The spring 4024 shown includes a helical portion that is circumferentially wound about an intermediate portion of the shaft 4100. One end of the torque spring 4024 pushes against the drive arm 4020, while an opposing end of the torque spring 4024 pushes against an interior wall of the transmission assembly 4008. Other configurations or combinations of springs or other devices can be adapted to provide a return force on the transmission assembly 4008 in accordance with the invention.

A second gear 4110 mounts to a second shaft 4112. The second gear 4110 contacts the first gear 4108, and receives force transferred from the drive shaft 4100 to the first gear 4108. When the first gear 4108 rotates in a counterclockwise direction, the second gear rotates in an opposing, clockwise direction. A third gear 4114 also mounts to the second shaft 4112, and rotates in the same direction as the second gear 4110. Thus, when the second gear 4110 rotates, the force transferred from the first gear 4108 is transferred to the second gear 4110, the second shaft 4112, and then to the third gear 4114. When the second gear 4110 rotates in a clockwise direction, the second shaft 4112 and third gear 4114 also rotate in a clockwise direction.

A fourth gear 4116 mounts to a corresponding axle 4118. The set of wheels 4028 mounts to the axle 4118 with a second one-way clutch or overrunning clutch 4120. The fourth gear 4116 engages the third gear 4114 such that the fourth gear 4116 rotates in an opposing and counterclockwise direction transmission assembly 4008 pivots around shaft 4100 Therefore, when a downward force is applied to the footboard 4000, the transmission assembly 4008 pivots around the shaft 4100 toward the front portion of the footboard 4000. The transmission assembly 4008 translates the pivoting motion into a rotational force on the set of wheels 4028 to drive the apparatus in a forward direction. Those skilled in the art will recognize that other configurations of gears, overrunning clutches, shafts or axles, and other devices can be used in accordance with the invention.

Note that the shafts 4100, 4112 and axle 4118 are supported by the casing 4012. The set of wheels 4028 mounts to opposing ends of the axle 4118. Conventional bearings for rotation of the shafts 4100, 4112, axle 4118, and set of wheels 4028 are used.

If the rotational speed of axle 4118 is slower than that of the set of wheels 4028 in a counterclockwise direction when the apparatus is moving in a forward direction, the overrunning clutches 4102, 4120 operate in a freewheeling condition. The freewheeling condition of the overrunning clutches 4102, 4120 permit the apparatus to move forward.

Figure 11:
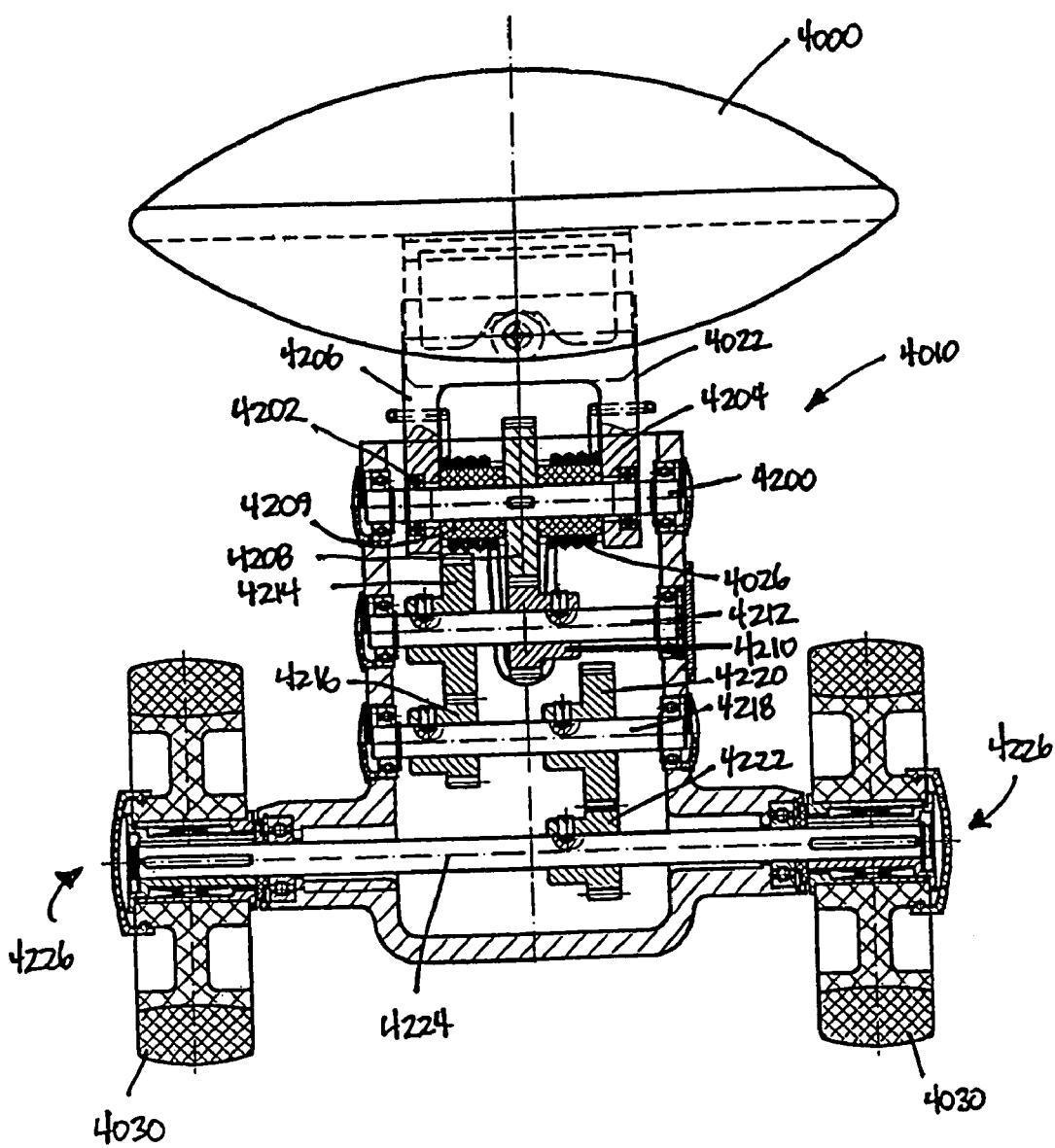
FIG. 11 is a rear sectional view of the apparatus shown in FIG. 9.

FIG. 11 is a rear detail view B—B of the apparatus shown in FIG. 9. This drawing illustrates the rear transmission assembly 4010 in greater detail. FIG. 11 shows the drive arm 4022 and a series of gears. Similar to the drive arm 4020 of the front transmission assembly shown in FIG. 10, the drive arm 4022 mounts to a first shaft 4200 with a first one-way clutch or first overrunning clutch 4202. In the embodiment shown, the drive arm 4022 includes a pair of arms 4204, 4206 that engage the first shaft 4200 at intermediate portions of the shaft 4200. A first gear 4208 also mounts to the first shaft 4200 near the central portion of the shaft 4200. The first overrunning clutch 4202 is set in a similar driving direction as the first gear 4208 so that the pivot of the transmission assembly 4010 around shaft 4200 rotates the shaft 4200 in a clockwise direction, thus rotating the first gear 4208 in a clockwise direction.

Torque spring 4026 also mounts to the shaft 4200 with a compressible material 4209 positioned between the torque spring 4026 and the shaft 4200. The torque spring 4026 and compressible material 4209 are adapted to provide a "return" force on the transmission assembly 4010. Similar to the spring 4024 shown in FIG. 10, the spring 4026 shown includes a helical portion that is circumferentially wound about an intermediate portion of the shaft 4200. One end of the torque spring 4024 pushes against the drive arm 4020, while an opposing end of the torque spring 4024 pushes against an interior wall of the transmission assembly 4010. Other configurations or combinations of springs or other devices can be adapted to provide a return force on the transmission assembly 4010 in accordance with the invention.

A second gear 4210 mounts to a second shaft 4212. The second gear 4210 contacts the first gear 4208, and receives force transferred from the drive shaft 4200 to the first gear 4208. When the first gear 4208 rotates in a clockwise direction, the second gear 4210 rotates in an opposing, counterclockwise direction. A third gear 4214 also mounts to the second shaft 4212, and rotates in the same direction as the second gear 4210. Thus, when the second gear 4210 rotates, the force transferred from the first gear 4208 is transferred to the second gear 4210, the second shaft 4212, and then to the third gear 4214. When the second gear 4210 rotates in a counterclockwise direction, the second shaft 4212 and third gear 4214 also rotate in a counterclockwise direction.

A fourth gear 4216 mounts to a third shaft 4218. The fourth gear 4216 contacts the third gear 4214, and receives force transferred from the drive shaft 4200, the first gear 4208, the second gear 4210, and the third gear 4214. When the third gear 4214 rotates in a counterclockwise direction, the fourth gear 4216 rotates in an opposing, clockwise direction. A fifth gear 4220 also mounts to the third shaft 4218, and rotates in the same direction as the fourth gear 4216. Thus, when the second gear 4210 rotates, the force transferred from the first gear 4208 is transferred to the second gear 4210, to the second shaft 4212 and third gear 4214, and then to the fourth gear 4216 and fifth gear 4220. When the fourth gear 4216 rotates in a clockwise direction, the third shaft 4218 and fifth gear 4220 also rotate in a clockwise direction.

A sixth gear 4222 mounts to a corresponding axle 4224 with the set of wheels 4030. The axle 4224 supports the set of wheels 4030 that mount to the axle 4224 via a second one-way clutch or overrunning clutch 4226. The fifth gear 4220 engages the sixth gear 4222 such that the fifth gear 4220 rotates in an opposing and counterclockwise direction when the drive arm 4022 moves in a downward direction. The sixth gear 4222 rotates in a single direction when the drive arm 4022 moves in either an upward or downward direction. Thus, when the fifth gear 4220 rotates in a counterclockwise direction, the axle 4226 and sixth gear 4222 rotate in an opposing, clockwise direction.

Therefore, when a downward force is applied to the footboard 4000, the transmission assembly 4010 pivots around the shaft 4200 toward the rear portion of the footboard 4000. The transmission assembly 4010 translates the pivoting motion into a rotational force on the set of wheels 4030 to drive the apparatus in a forward direction. Those skilled in the art will recognize that other configurations of gears, overrunning clutches, shafts or axles, and other devices can be used in accordance with the invention.

Note that the shafts 4200, 4212, 4218, and axle 4224 are supported by the casing 4014. The set of wheels 4030 mounts to opposing ends of the axle 4224. Conventional bearings for rotation of the shafts 4200, 4212, 4218, axle, 4224, and set of wheels 4030 are used.

If the rotational speed of axle 4224 is slower than that of the set of wheels 4030 in a counterclockwise direction when the apparatus is moving in a forward direction, the overrunning clutches 4202, 4226 operate in a freewheeling condition. The freewheeling condition of the overrunning clutches 4202, 4226 permits the apparatus to move forward.

Figure 12:
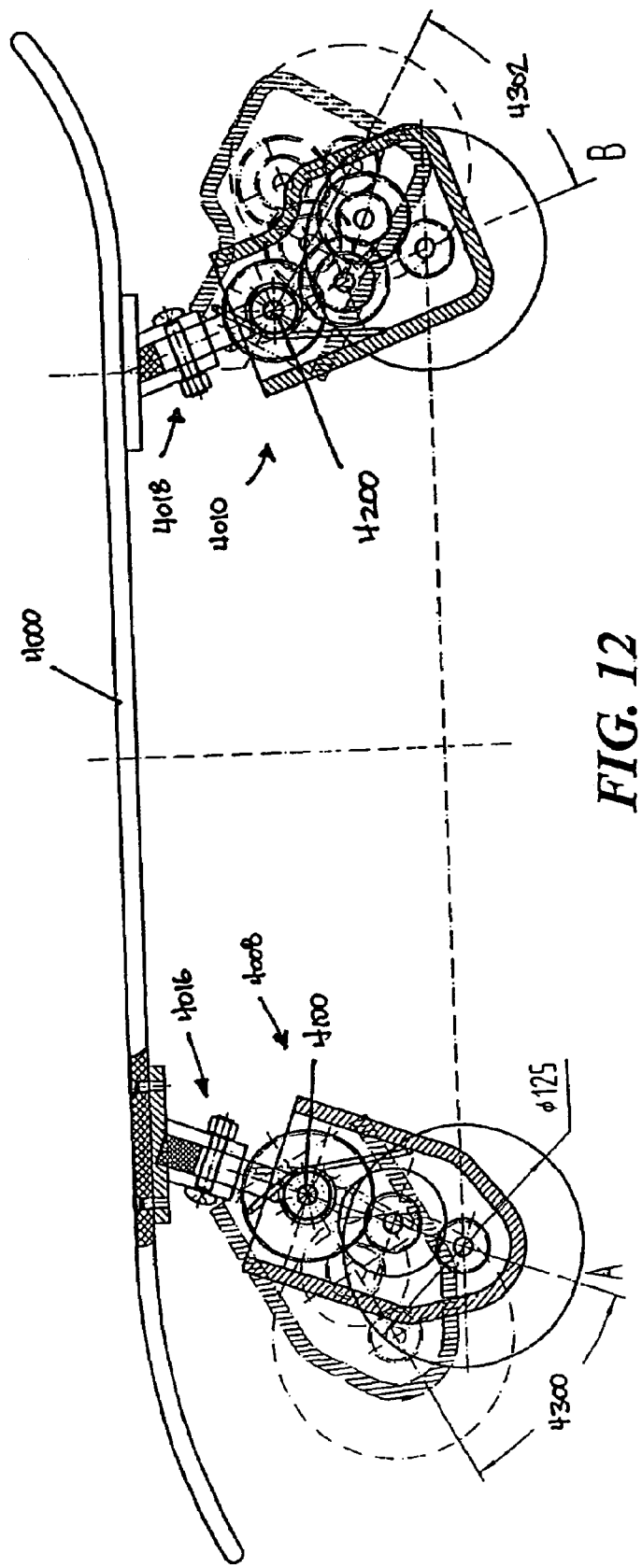
FIG. 12 is a side view of the apparatus shown in FIG. 9, with a pivoting range of motion shown for each transmission assembly.

FIG. 12 is a side view of the apparatus shown in FIG. 9, with a pivoting range of motion shown for each transmission assembly. When in use, the apparatus shown here adapts to the downward force generated by the user on the footboard 4000, such as the body weight of the user, by pivoting the transmission assemblies 4008, 4010 upward and outward in response to the downward force. For example, when a user stands on the footboard 4000, each of the transmission assemblies 4008, 4010 can respectively pivot upward and outward with respect to the first shafts 4100, 4200 as shown. The range of the pivot angles 4300, 4302 for each transmission assembly 4008, 4010 increases as the downward force increases. In the embodiment shown, a range of pivot angles 4300, 4302 between approximately 0 to 40 degrees for both the front transmission assembly 4008 and rear transmission assembly 4010 can be achieved.

To initiate forward movement and to increase the forward velocity of the apparatus, a user stands on the footboard 4000 and applies alternate and repetitive downward forces on the front portion and rear portion of the footboard 4000. As the footboard 4000 moves downward, each of the drive arms 4020, 4022 transfer the alternating downward forces to the respective transmission assemblies 4008, 4010. Each of the torque springs 4024, 4026 then provide repetitive and alternate upward "return" forces to the footboard 4000.

For directional steering of the apparatus, such as making a turn, the footboard 4000 tilts in either lateral direction. While standing on the footboard 4000, a user initiates a turn by shifting his or her body weight in a lateral direction depending on the desired direction of the turn. As the user shifts his or her body weight, the footboard 4000 tilts in a desired lateral direction. By shifting his or her body weight in a lateral direction, the user generates a lateral force on the footboard 4000. The hinge joints 4016, 4018 permit the footboard 4000 to pivot laterally, such as either to the left or right, as the compressible material 4109, 4209 deforms with the force applied by the user. The pivoting of the footboard 4000 to either side changes the direction of the arm mount frames 4032, 4034, and automatically turns the drive arms 4020, 4022 in the same direction. The pivot or direction of turn by the drive arms 4020, 4022 determines the direction of each respective transmission assembly 4008, 4010. Thus, when a lateral force is applied to the footboard, the transmission assemblies 4008, 4010 pivot in opposing lateral directions to each other, turning the sets of wheels 4028, 4030 in opposing directions and facilitating turning of the apparatus.

Figure 13A:
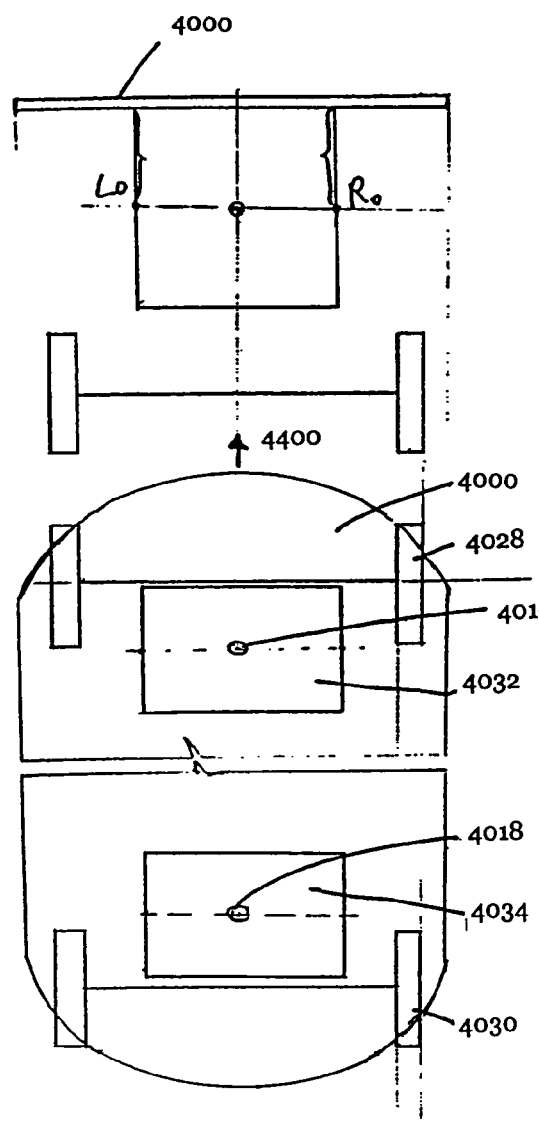
FIG. 13A is a bottom schematic view of the apparatus shown in FIG. 9, with the wheels oriented for moving the apparatus in a forward direction.
Figure 13B:
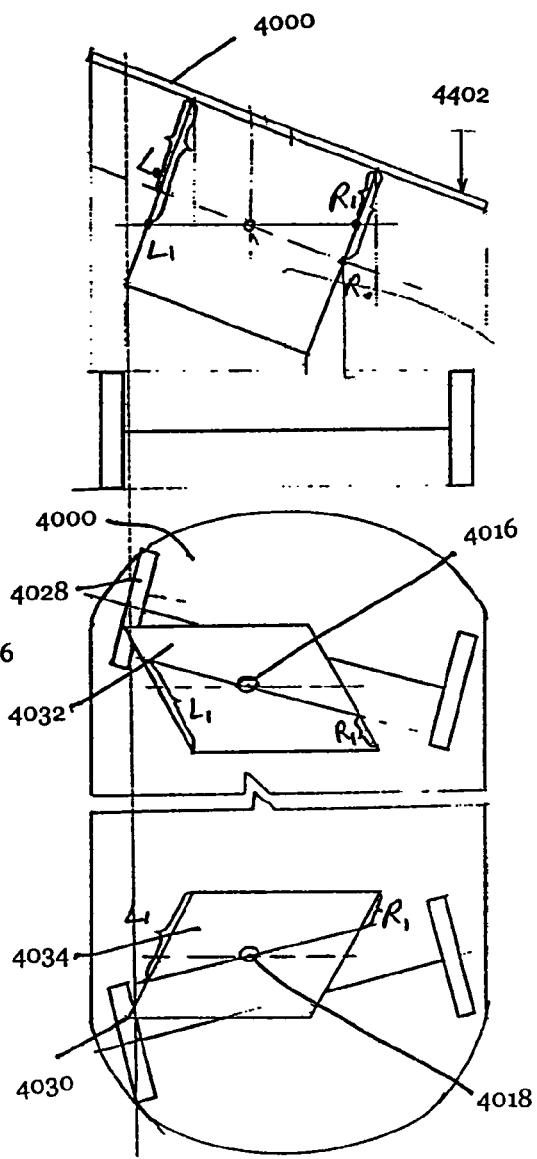
FIG. 13B is a bottom schematic view of the apparatus shown in FIG. 9, with the wheels oriented for turning the direction of the apparatus.

FIGS. 13A and 13B illustrate the operation of the apparatus shown in FIGS. 9–12. FIG. 13A is a bottom schematic view of the apparatus shown in FIG. 9–12, with the wheels oriented for moving the apparatus in a forward direction. FIG. 13B is another bottom view of the apparatus shown in FIGS. 9–12, with the wheels oriented for turning the direction of the apparatus. As shown in FIG. 13A, the apparatus is positioned in a substantially straight orientation with the front arm mount frame 4032 and rear arm mount frame 4034 similarly aligned. Note that the set of wheels 4028 for the front arm mount frame 4032 is in a similar orientation as the set of wheels 4030 for the rear arm mount frame 4034. In the orientation shown, the apparatus can travel in a relatively straight direction, such as a forward direction 4400.

When a user initiates a turn with the apparatus, the user applies a downward, lateral force 4404 to the footboard 4000. As shown in FIG. 13B, the footboard 4000 transfers the downward, lateral force 4402 to the hinge joints 4016, 4018 and the arm mount frames 4032, 4034. The tilting of the platform 4000 causes the platform to rotate with respect to the hinge joints 4016, 4018, thus changing the direction of arm mount frames 4032, 4034. The change in direction of arm mount frames 4032, 4034 pivots the respective drive arms 4020, 4022 and the transmission assemblies 4008, 4010 in a corresponding direction.

Figure 14:
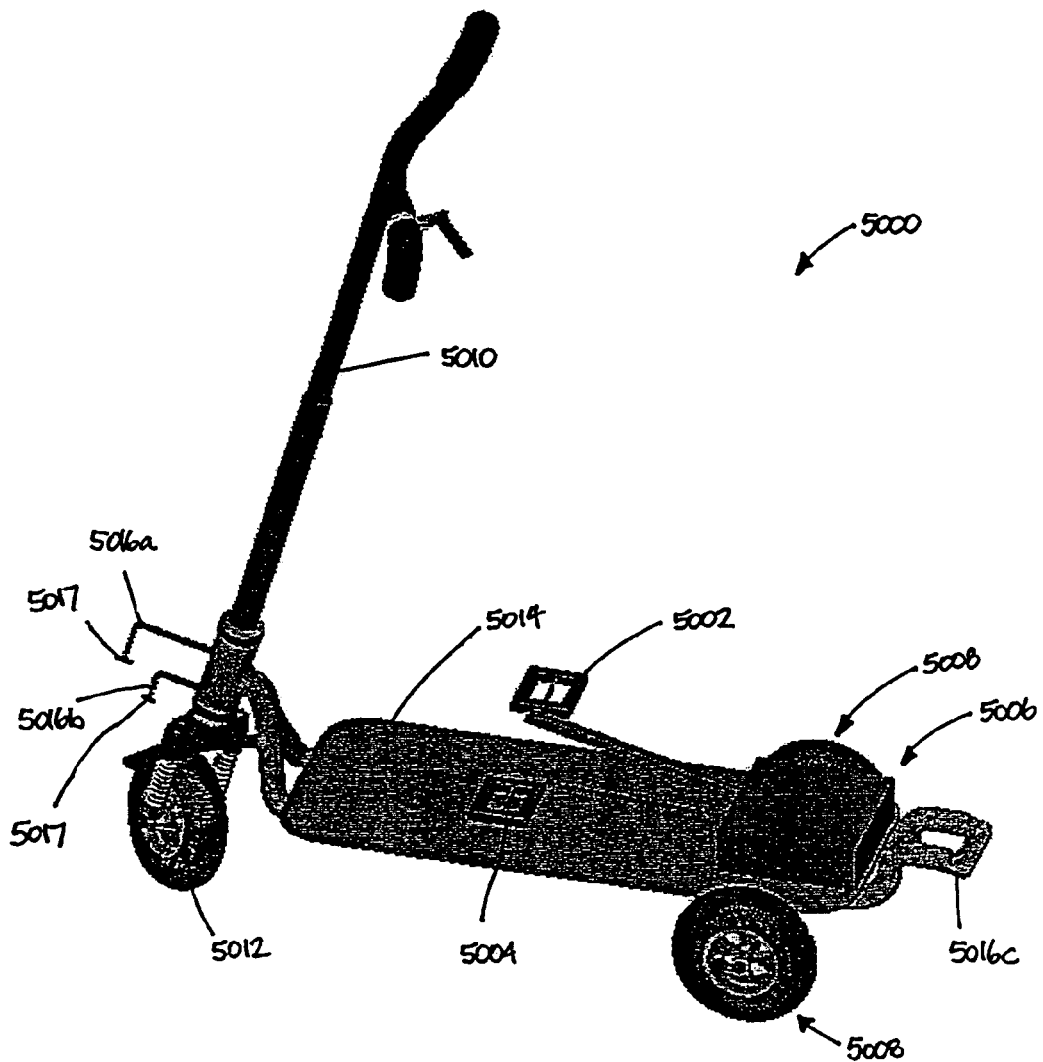
FIG. 14 is a perspective view of a fifth embodiment of an apparatus in accordance with the invention.

FIG. 14 is a perspective view of a fifth embodiment of an apparatus in accordance with the invention. The apparatus shown is a scooter 5000 that is propelled by driving two pedals 5002, 5004 upward and downward. Each pedal 5002, 5004 is adapted to receive a portion of a user's body weight when a user's foot is placed on each pedal 5002, 5004. Each pedal 5002, 5004 is also adapted to move between an initial position and a depressed position. The scooter 5000 also includes a geartrain or transmission assembly 5006 oriented towards the rear portion of the scooter 5000 that translates downward force on the pedals 5002, 5004 to a rotational force on a set of wheels 5008. The scooter 5000 further includes a T-shaped steering handle 5010 which mounts to a front wheel 5012 and a lower frame 5014. Note that the geartrain shown is by example only, and other configurations and devices for propelling a scooter can be utilized in accordance with various embodiments of the invention. A geartrain can include, but is not limited to, chain type-drives, band type-drives, hydraulic-type drives, or other gear drives that translate a downward force into a rotational force.

The embodiment shown is also called a "reverse" pedaling scooter. With conventional scooters and pedal-type devices, users operate the conventional devices by facing a drive arm shaft of a geartrain. Users operating the described embodiment experience a different type of pedaling motion than with conventional devices since the drive arm shaft of the geartrain or transmission assembly 5006 shown is positioned behind the user.

Figure 22:
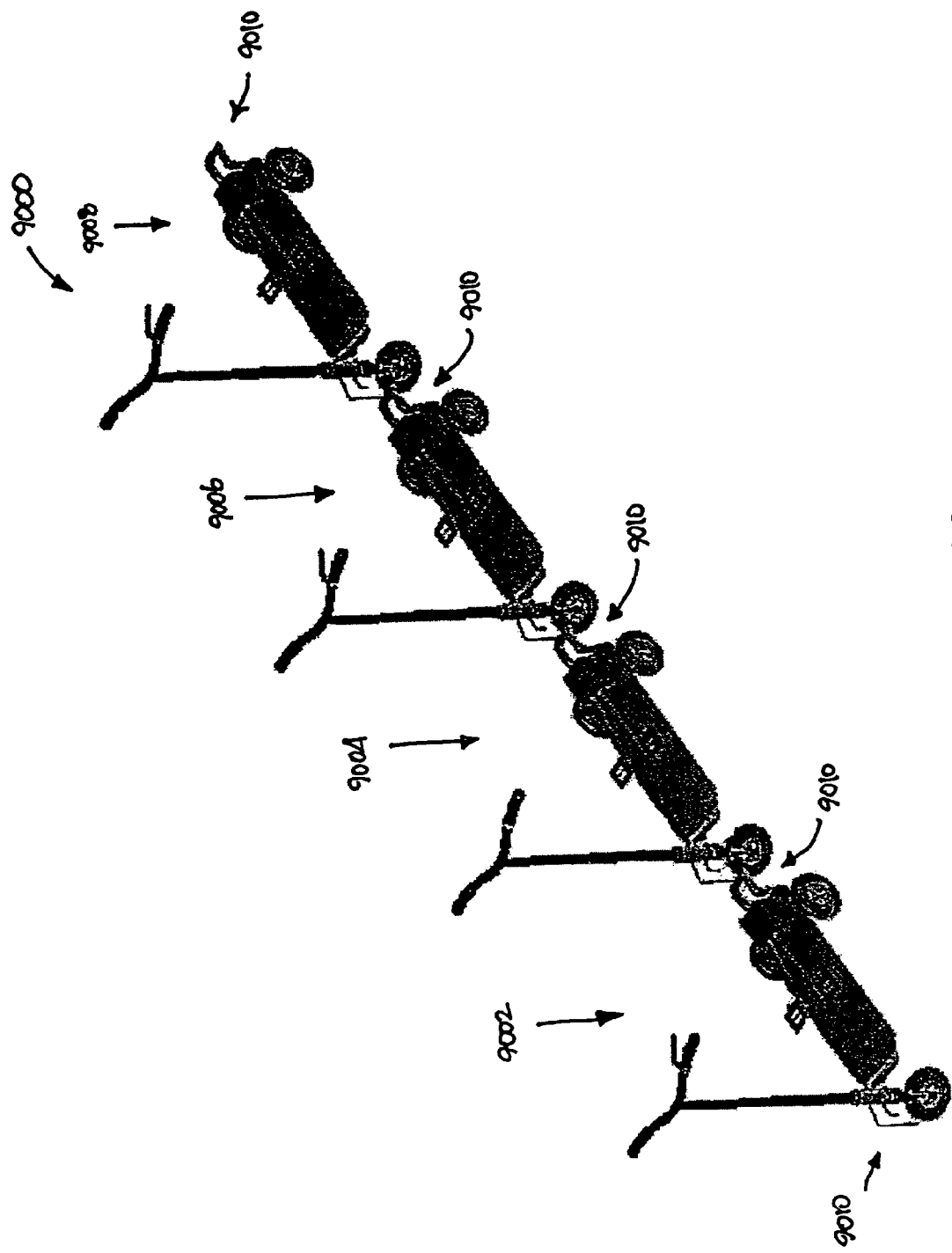
FIG. 22 is a scooter train in accordance with the invention.

The scooter 5000 also includes attachment devices 5016a, 5016b, in the front portion of the scooter 5000, and attachment device 5016c in the rear portion of the scooter 5000. The attachment devices 5016a, 5016b, 5016c are adapted to connect the scooter 5000 to other scooters with corresponding attachment devices 5016a, 5016b, 5016c or similar type devices to form a scooter train as shown in FIG. 22. Attachment device 5016a is a L-shaped hook that mounts to the front portion of the lower frame 5014 or to a sleeve on the handle 5010 with an extended portion of the L-shaped hook facing downward. The L-shaped hook portion includes an adjustable nut 5017 at the end of the portion facing downward. Likewise attachment device 5016b is a relatively smaller L-shaped hook that mounts to the front portion of the lower frame 5014 or to a sleeve on the handle 5010 with an extended portion of the hook facing downward. The L-shaped hook portion also includes an adjustable nut 5017 at the end of the portion facing downward. Corresponding attachment device 5016c is an elongated loop that mounts to the rear portion of the lower frame 5014 and can receive the extended portion of attachment device 5016a or 5016b. Either of the attachment devices 5016a, 5016b can be further secured to attachment device 5016c by mounting the respective attachment devices 5016a, 5016b to the corresponding attachment device 5016c, and then mounting the adjustable nut 5017 to the extended end of attachment device 5016a, 5016b. Adjusting the adjustable nut 5017 limits the insertion of the L-shaped hook portion of an attachment device 5016a, 5016b into a corresponding attachment device 5016c.

When a scooter with attachment device 5016b connects to the rear portion of a scooter with corresponding attachment device 5016c, the front wheel 5012 of the scooter is lifted from the ground and the front portion of the scooter 5000 is supported by the connection between attachment devices 5016b and 5016c. The front scooter will control the steering for both scooters, and both scooters can be propelled by use of the paddles. If a scooter with attachment device 5016a connects to the rear portion of a scooter with corresponding attachment device 5016c, the front wheel 5012 of the scooter touches the ground. The rear scooter can partially control the steering for the connected scooters, while both scooters can be propelled by use of the paddles. In either configuration, multiple scooters with connection devices 5016a, 5016b, 5016c can be connected together to form a "scooter train" as shown in FIG. 22. Other devices or methods to connect scooters together can be used in accordance with the invention.

FIGS. 15–17 illustrate a transmission assembly for the apparatus shown in FIG. 14. FIG. 15 is a side sectional view of a transmission assembly, FIG. 16 is an overhead sectional view of the transmission assembly shown in FIG. 15, and FIG. 17 is a cross sectional view of the transmission assembly shown in FIG. 15. The two pedals 5002, 5004 mount to a respective drive arm 5018, 5020 that also connect to the transmission assembly 5006. The drive arms 5018, 5020 cooperate with the transmission assembly 5006 so that when one pedal 5002 moves in a downward direction, the other pedal 5004 moves in an opposing, upward direction. This type of action is also known as "drive pedal recovery" or "drive arm recovery." Devices that perform this type of action, such as the combination of shafts, gears, and clutches shown here, are known as "recovery action" devices. The drive arms 5018, 5020 each mount to a first shaft 5022 via a respective one-way or overrunning clutch 5024, 5026. When drive arm 5018 is pressed down, a first return gear 5028 engages a second return gear 5030, and second return gear 5030 further engages a third return gear 5032 mounted on a second shaft 5034. Subsequent rotation of the third return gear 5032 rotates the second shaft 5034 in a counterclockwise direction. In turn, second shaft 5034 rotates fourth return gear 5036, and fourth return gear 5036 engages and rotates fifth return gear 5038 in a clockwise direction.

Due to the staggered cross-sectional view of FIG. 17, the fourth return gear 5036 and fifth return gear 5038 are not shown engaging each other. Note also that the first return gear 5028 and third return gear 5032 have the same number of gear teeth, and likewise, the fourth return gear 5036 and fifth return gear 5038 have the same number of gear teeth. The number of gear teeth of the third return gear 5032 is less than that of the fourth return gear 5036 so that the first return gear 5028 and third return gear 5032 do not directly engage, while the fourth return gear 5036 and fifth return gear 5038 are directly engaged.

The starting position of drive arms 5018, 5020 can be manually adjusted by repositioning the respective second return gear 5030. When the second return gear 5030 is pulled outward and away from first return gear 5028, the drive arms 5018, 5020 can be vertically raised or lowered with respect to the second return gear 5030. After adjustment of the drive arms 5018, 5020 to a desired starting position, second return gear 5030 is pushed back towards and engaged with the first return gear 5028. In this manner, the vertical positions of the drive arms 5018, 5020 can be adjusted for the convenience, comfort, or fit of a user.

The drive arm or drive pedal recovery action in the transmission assembly 5006 provides a "return" force to each respective drive arm 5018, 5020 when the opposing drive arm 5018, 5020 moves to a depressed position. For example, when drive arm 5018 is initially positioned at a relatively higher starting position and the drive arm 5018 receives a downward force, the drive arm 5018 moves pedal 5002 from to a lower, depressed position. The drive arm or drive pedal recovery action moves the opposing drive arm 5020 from an initial lower, depressed position to a relatively higher position where the corresponding pedal 5004 can receive a downward force from the user. The user forces drive arm 5020 and pedal 5004 downward, and the drive arm or drive pedal recovery action in the transmission assembly 5006 provides a "return" force to drive arm 5018 and pedal 5002 moves back to the higher starting position.

Downward forces applied to the pedals 5002, 5004 are transferred to the rear set of wheels 5008 by the transmission assembly 5006. The transmission assembly 5006 includes a first drive gear 5040 mounted to the first shaft 5022, a second drive gear 5042 mounted to a second shaft 5044, a third drive gear 5046 mounted to the second shaft 5044, and a fourth drive gear 5048 mounted to a rear axle 5050.

Note that the shafts 5022, 5044, and axle 5050 are supported by a casing 5052. The set of wheels 5008 mounts to opposing ends of the axle 5050. Conventional bearings for rotation of the shafts 5022, 5044, axle 5050, and set of wheels 5008 are used.

Downward forces transferred from the pedals 5002, 5004 to the overrunning clutches 5024, 5026 are transmitted to the first drive gear 5040 via the first shaft 5022. The first drive gear 5040 transfers the force to the second drive gear 5042. The second drive gear 5042 transfers the force through the second shaft 5044 to the third drive gear 5046. The third drive gear 5046 then transmits the force to the fourth drive gear 5048, and the fourth drive gear 5048 transmits the force to the rear axle 5050. The force on the rear axle 5050 causes the rear set of wheels 5008 mounted to the rear axle 5050 to turn accordingly. Other configurations of gears can be utilized for a transmission assembly in accordance with the invention.

A second one-way clutch or overrunning clutch 5054, 5056 in each wheel of the rear set of wheels 5008 permits the rear set of wheels 5008 to rotate faster than the rear axle 5050. This type of motion is similar to the freewheeling motion described with respect to the embodiments above.

An optional brake (not shown) can be mounted to the set of wheels 5008, and a manual grip (not shown) to apply the brake can be connected to the handle 5010. Those skilled in the art will recognize the type of brake and manual grip that can be utilized in accordance with the invention.

A user operates the scooter 5000 by repetitively and alternatively depressing each pedal 5002, 5004 in a downward direction. The downward forces on the pedals 5002, 5004 are translated by the transmission assembly 5006 into a rotational force on the set of wheels 5008, propelling the scooter 5000 in a forward direction. Directional steering of the scooter can be achieved by turning the handle 5010 and front wheel 5012 in the desired direction of travel. When used in conjunction with other scooters with corresponding attachment devices, the scooter 5000 can be connected via the attachment devices 5016a, 5016b, 5016c to form a scooter train shown in FIG. 22 that can be propelled and steered in a similar manner as described above.

Figure 18:
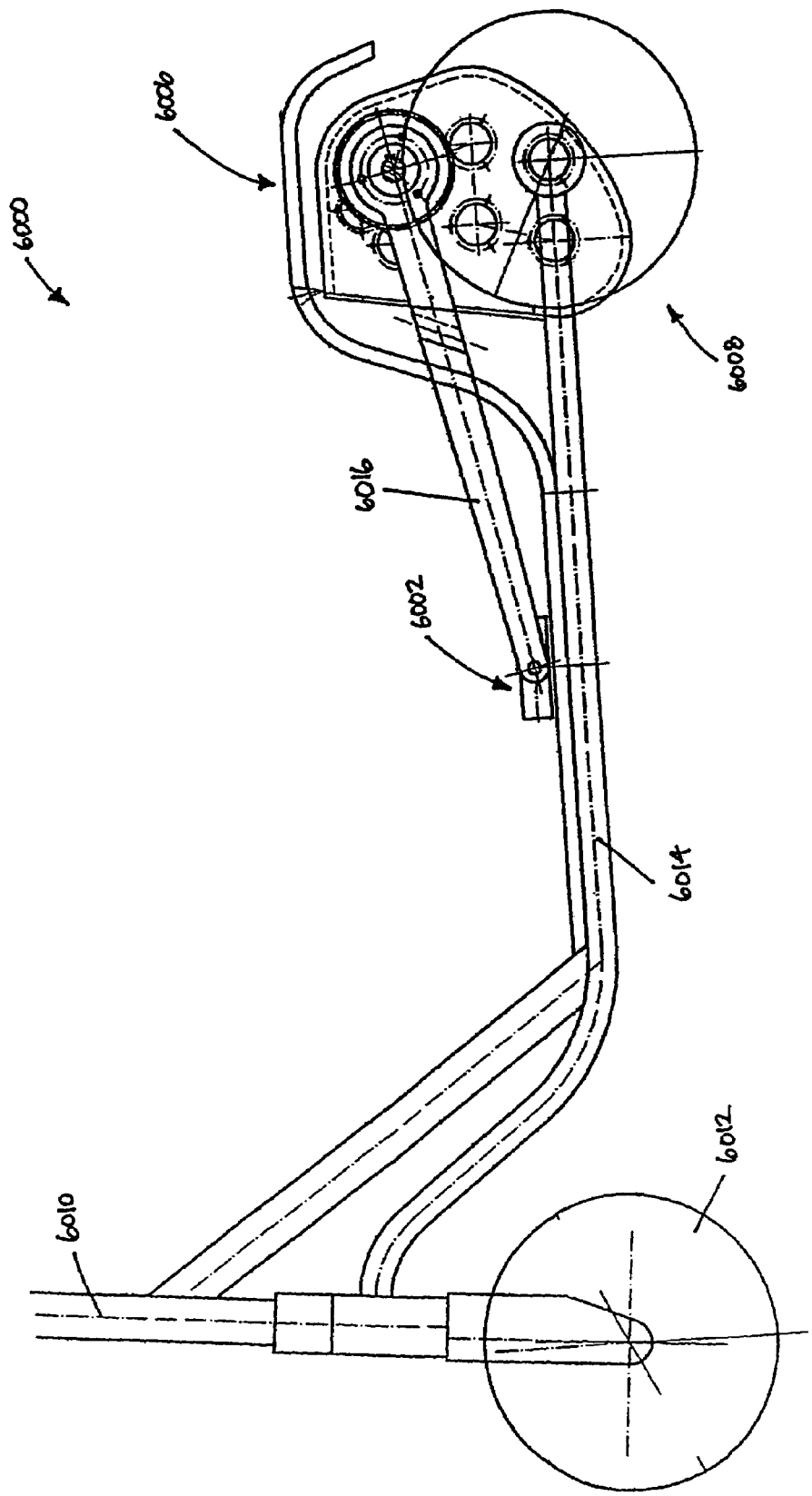
FIG. 18 is a sixth embodiment of an apparatus in accordance with the invention.
Figure 19:
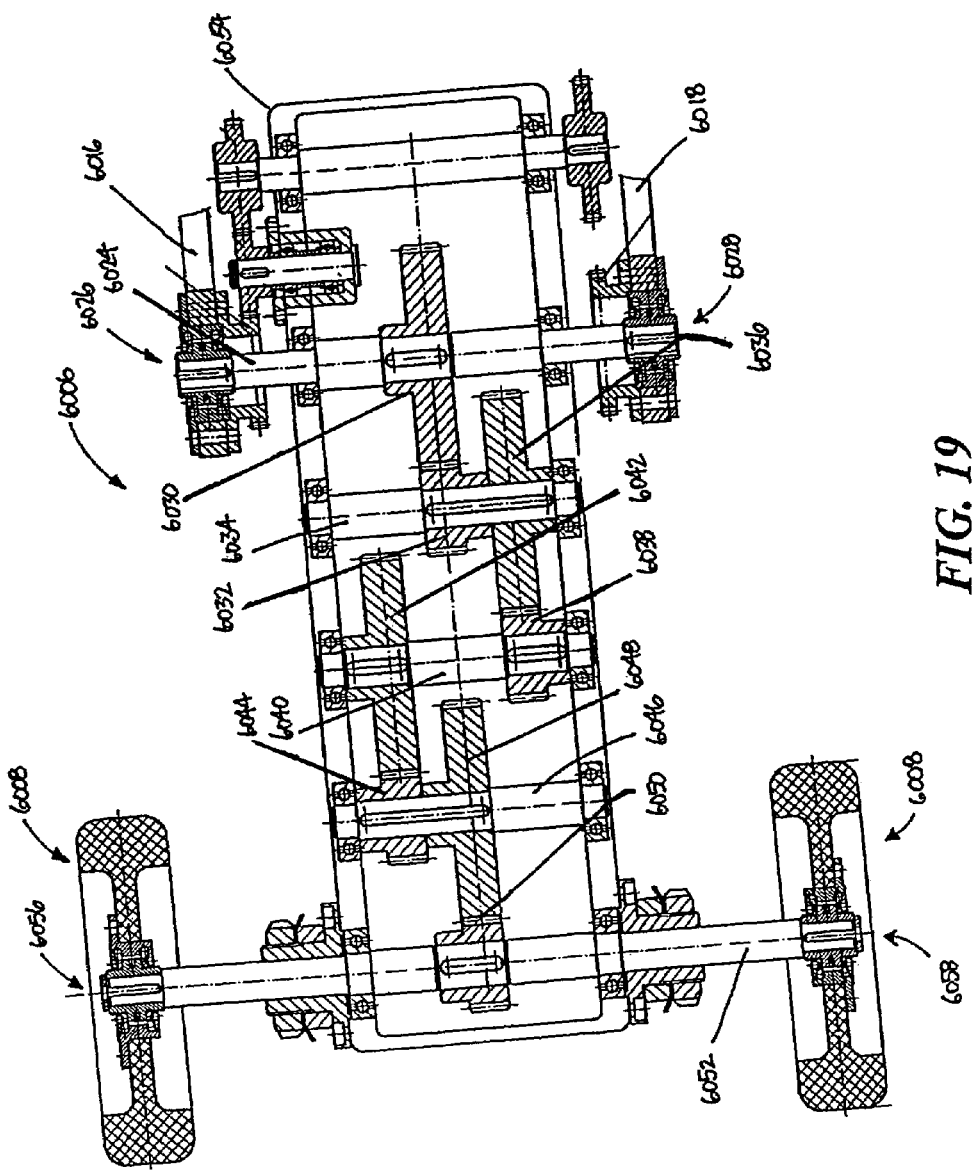
FIG. 19 is an overhead sectional view of a transmission assembly for the apparatus shown in FIG. 18.

FIG. 18 is a sixth embodiment of an apparatus in accordance with the invention. FIG. 18 shows a partial side view of the apparatus. FIG. 19 is an overhead cross-sectional view of a transmission assembly for the apparatus shown in FIG. 18. Note that the view shown in FIG. 19 is a staggered sectional view through multiple planes of the transmission assembly. The apparatus shown is a scooter 6000 that is propelled by driving two pedals 6002, 6004 upward and downward. Each pedal 6002, 6004 is adapted to receive a portion of a user's body weight when each of a user's feet are placed on a respective pedal 6002, 6004. Each pedal 6002, 6004 is also adapted to move between an initial position and a depressed position. The scooter 6000 also includes a geartrain or transmission assembly 6006 oriented towards the rear portion of the scooter 6000 that translates downward force on the pedals 6002, 6004 to a rotational force on a set of wheels 6008. Note that the geartrain shown is by example only, and other configurations and devices can be utilized in accordance with various embodiments of the invention. A geartrain can include, but is not limited to, chain type-drives, band type-drives, hydraulic-type drives, or other gear drives that translate a downward force into a rotational force. The scooter 6000 includes a T-shaped steering handle 6010 which mounts to a front wheel 6012 and a lower frame 6014.

Note that the apparatus shown is similar to and operates in a similar manner as the embodiment described in FIGS. 14–17. The differences are that there are two additional shafts in the transmission assembly 6006 of the embodiment shown, and the transmission assembly 6006 is mounted partially above the frame 6014.

Figure 20:
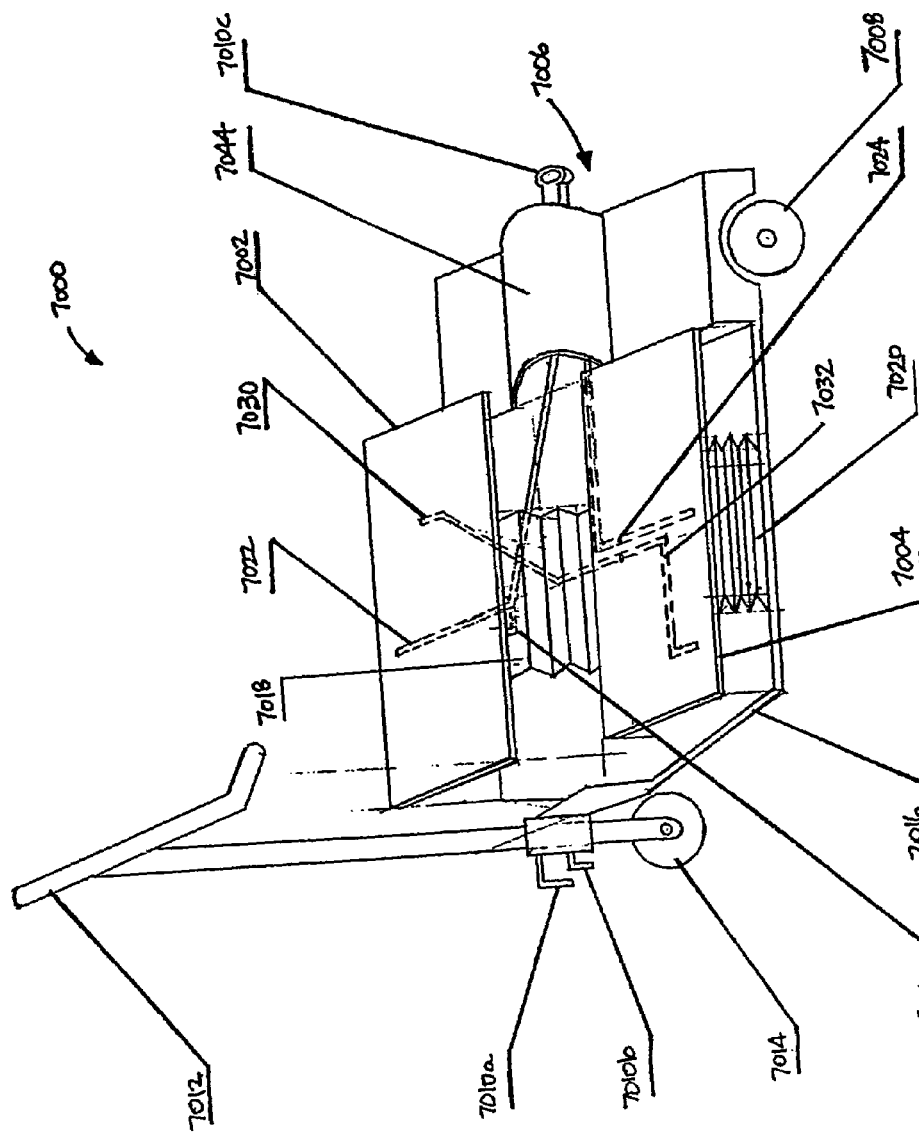
FIG. 20 is a perspective view of a seventh embodiment of an apparatus in accordance with the invention.

FIG. 20 is a perspective view of a seventh embodiment of an apparatus in accordance with the invention. In this embodiment, the apparatus is a scooter 7000 that is propelled by driving two pedals 7002, 7004 upward and downward. The pedals 7002, 7004 are adapted to receive a portion of a user's body weight when each of the user's feet are placed on a respective pedal 7002, 7004. The pedals 7002, 7004 are adapted to move between an initial position and a depressed position. The scooter 7000 also includes a geartrain or transmission assembly 7006 oriented towards the rear portion of the scooter 7000 that translates downward force on the pedals 7002, 7004 to a rotational force on a set of wheels 7008. Note that the geartrain shown is by example only, and other configurations and devices to propel a scooter can be utilized in accordance with various embodiments of the invention. A geartrain can include, but is not limited to, chain type-drives, band type-drives, hydraulic-type drives, or other gear drives that translate a downward force into a rotational force. The scooter 7000 also includes attachment devices 7010a, 7010b in the front portion of the scooter 7000, and attachment device 7010c in the rear portion of the scooter 7000. The attachment devices 7010a, 7010b, 7010c are similar to those shown and described above as 5016a, 5016b, 5016c in FIG. 14, and can operate in conjunction with other scooters with corresponding attachment devices to form a scooter train as shown in FIG. 22.

Referring back to FIG. 20, the scooter 7000 includes a T-shaped steering handle 7012 which mounts to a front wheel 7014 and a lower frame 7016. The two pedals 7002, 7004 both mount to the lower frame 7016 with a respective leaf spring 7018, 7020 for each pedal 7002, 7004. One end of each leaf spring 7018, 7020 mounts to an upper surface of the lower frame 7016 and an opposing end of each leaf spring 7018, 7020 mounts to the lower surface of a respective pedal 7002, 7004. A drive arm 7022, 7024 also mounts to the lower surface of each pedal 7002, 7004. A respective drive arm guide 7026, 7028 mounted to the lower surface of each pedal 7002, 7004 limits the movement of the drive arms 7022, 7024 with respect to the pedals 7002, 7004. An opposing end of each drive arm 7022, 7024 connects to the transmission assembly 7006. An angled crankshaft 7030, 7032 also mounts to the lower surface of each pedal 7002, 7004, and each mounts to the upper surface of the lower frame 7016. The drive arms 7022, 7024, crankshafts 7030, 7032, and leaf springs 7018, 7020 cooperate with the transmission assembly 7006 so that when one pedal 7002 moves in an upward direction, the other pedal 7004 moves in an opposing, downward direction. The drive arms 7022, 7024 each mount to a first shaft 7034 via a respective one-way or overrunning clutch 7036, 7038. A spring 7040, 7042 mounts to each drive arm 7022, 7024 to provide an upward "return" force to the drive arm 7022, 7024 when the respective arm 7022, 7024 moves to a depressed position. The upward "return" force moves the drive arm 7022, 7024 to the initial position to receive another downward force. Note that in this embodiment, the springs 7040, 7042 act as "recovery action" devices. The set of wheels 7008 also includes a one-way or overrunning clutch (not shown) to permit the wheels to continue rotating or otherwise rotate faster than the rotation of the corresponding axle for the set of wheels 7008.

An optional brake (not shown) can be mounted to the set of wheels 7008, and a manual grip (not shown) to apply the brake can be connected to the handle 7012. Those skilled in the art will recognize the type of brake and manual grip that can be utilized in accordance with the invention.

The transmission assembly 7006 includes a series of gears similar to those shown and previously described in FIG. 15–17. A casing 7044 protects the transmission assembly 7006 from exterior contact or interference from the user or exterior objects. The scooter 7000 shown in FIG. 20 operates in a similar manner as the apparatuses shown and described in FIGS. 14–17, and FIGS. 18–19.

Figure 21:
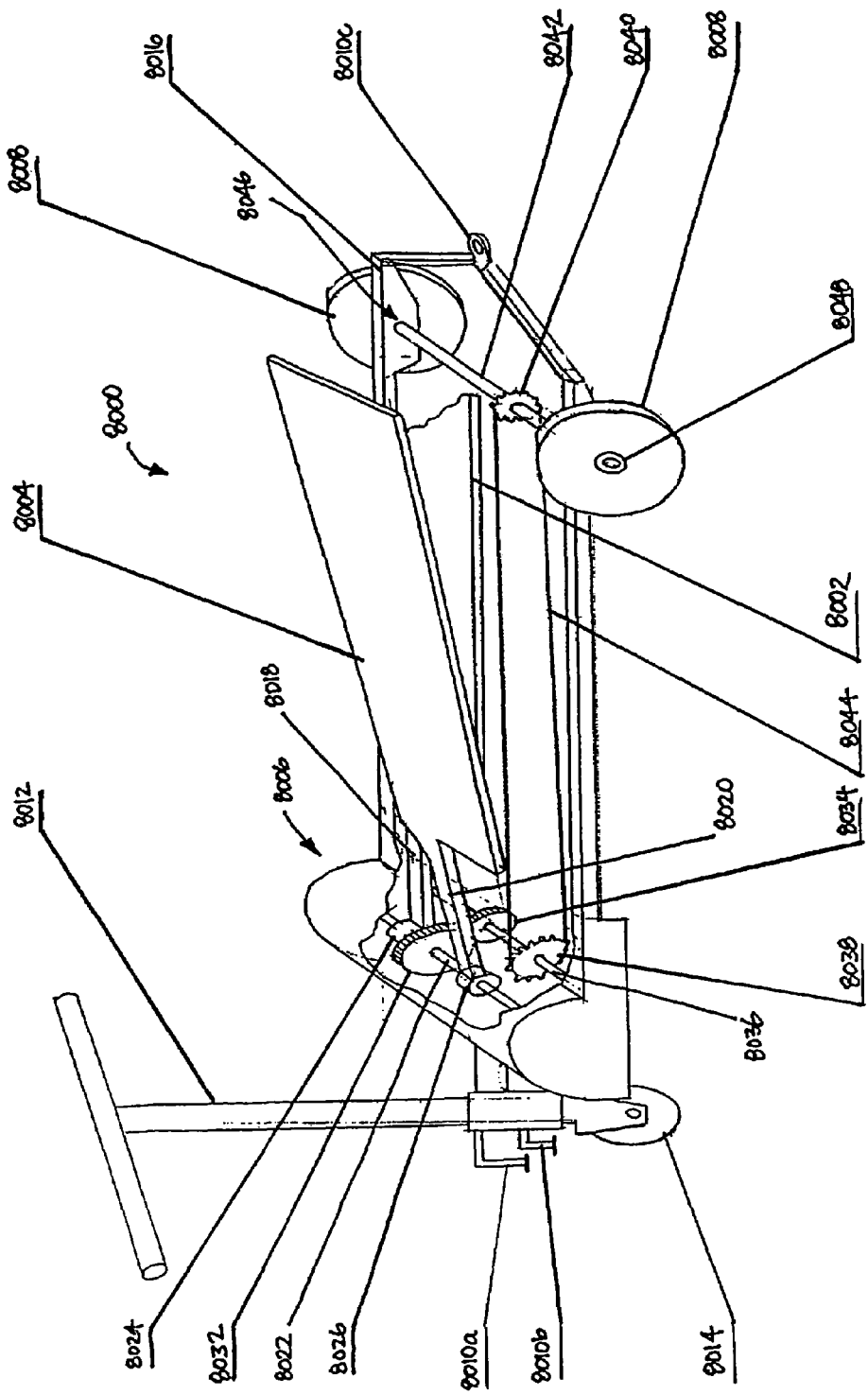
FIG. 21 is a perspective view of an eighth embodiment of an apparatus in accordance with the invention.

FIG. 21 is a perspective view of an eighth embodiment of an apparatus in accordance with the invention. In this embodiment, the apparatus is a scooter 8000 that is propelled by driving two pedals 8002, 8004 upward and downward. The pedals 8002, 8004 are adapted to receive a portion of a user's body weight when each of the user's feet is placed on a respective pedal 8002, 8004. The pedals 8002, 8004 are adapted to move between an initial position and a depressed position. The scooter 8000 also includes a geartrain or transmission assembly 8006 oriented towards the front portion of the scooter 8000 that translates downward force on the pedals 8002, 8004 to a rotational force on a rear set of wheels 8008. Note that the geartrain shown is by example only, and other configurations and devices can be utilized in accordance with various embodiments of the invention. A geartrain can include, but is not limited, chain type-drives, band type-drives, hydraulic-type drives, or other gear drives that translate a downward force into a rotational force.

The scooter 8000 also includes attachment devices 8010a, 8010b in the front portion of the scooter 8000, and attachment device 8010c in the rear portion of the scooter 8000. The attachment devices 8010a, 8010b, 8010c are similar to those shown and described above as 5016a, 5016b, 5016c in FIG. 14, and can operate in conjunction with other scooters with corresponding attachment devices to form a scooter train as shown in FIG. 22.

Referring back to FIG. 20, the scooter 8000 includes a T-shaped steering handle 8012 which mounts to a front wheel 8014 and a lower frame 8016. The two pedals 8002, 8004 mount to a respective driving arm 8018, 8020 that connect to the transmission assembly 8006. The driving arms 8018, 8020 cooperate with the transmission assembly 8006 so that when one pedal 8002 moves in an upward direction, the other pedal 8004 moves in an opposing, downward direction. The driving arms 8018, 8020 each mount to a first shaft 8022 via a respective one-way or overrunning clutch 8024, 8026. A spring or leaf spring (not shown) mounts to each driving arm 8018, 8020 to provide an upward "return" force to the driving arm 8018, 8020 when the respective arm 8018, 8020 moves to a depressed position. The upward "return" force moves the driving arm 8018, 8020 to the initial position to receive another downward force. Note that in this embodiment, the springs or leaf springs act as "recovery action" devices.

Downward forces applied to the pedals 8002, 8004 are transferred to rear set of wheels 8008 by the transmission assembly 8006. The transmission assembly 8006 includes a drive gear 8032 mounted to the first shaft 8022, an intermediate gear 8034 mounted to a second shaft 8036, a first ratchet wheel 8038 mounted to the second shaft 8036, a second ratchet wheel 8040 mounted to a rear axle 8042, and a circular chain 8044 extended between the first ratchet wheel 8038 and second ratchet wheel 8040. Downward forces transferred from the pedals 8002, 8004 to the overrunning clutches 8024, 8026 are transmitted to the drive gear 8032. The drive gear 8032 transfers the force to the intermediate gear 8034, and the force is further transmitted to the first ratchet wheel 8038. The chain 8044 transfers the force to the second ratchet wheel 8040 and the rear set of wheels 8008 mounted to the rear axle 8042 turns accordingly. Other configurations of gears can be utilized for the transmission assembly in accordance with the invention.

A second one-way clutch or overrunning clutch 8046, 8048 in each wheel of the rear set of wheels 8008 permits the rear set of wheels 8008 to rotate faster than the rear axle 8042. This type of freewheeling motion is similar to that described in the embodiments above.

An optional brake (not shown) can be mounted to the set of wheels 8008, and a manual grip (not shown) to apply the brake can be connected to the handle 8012. Those skilled in the art will recognize the type of brake and manual grip that can be utilized in accordance with the invention.

The scooter 8000 shown in FIG. 21 operates in a similar manner as the apparatuses shown and described in FIGS. 14–17, FIGS. 18–19, and FIG. 20.

FIG. 22 is a scooter train in accordance with the invention. A scooter train 9000 is a combination of two or more scooters 9002, 9004, 9006, 9008 equipped with connection devices 9010 similar to those shown as 5016a, 5016b, 5016c shown in FIG. 14 and also to those shown in FIGS. 20 and 21. The scooter train 9000 can be propelled by one or more users on any of the scooters, preferably by a user on the lead scooter 9002. Depending on the combination of connection devices 9010 used, one or more of the users can control the direction of the scooter train 9000 by steering a respective scooter 9002, 9004, 9006, 9008. In most cases, the lead scooter 9002 can control the direction of the scooter train 9000. Note that the combination of scooters shown is shown by example only, and greater or lesser numbers of scooters can be used in a scooter train 9000.

Figure 23:
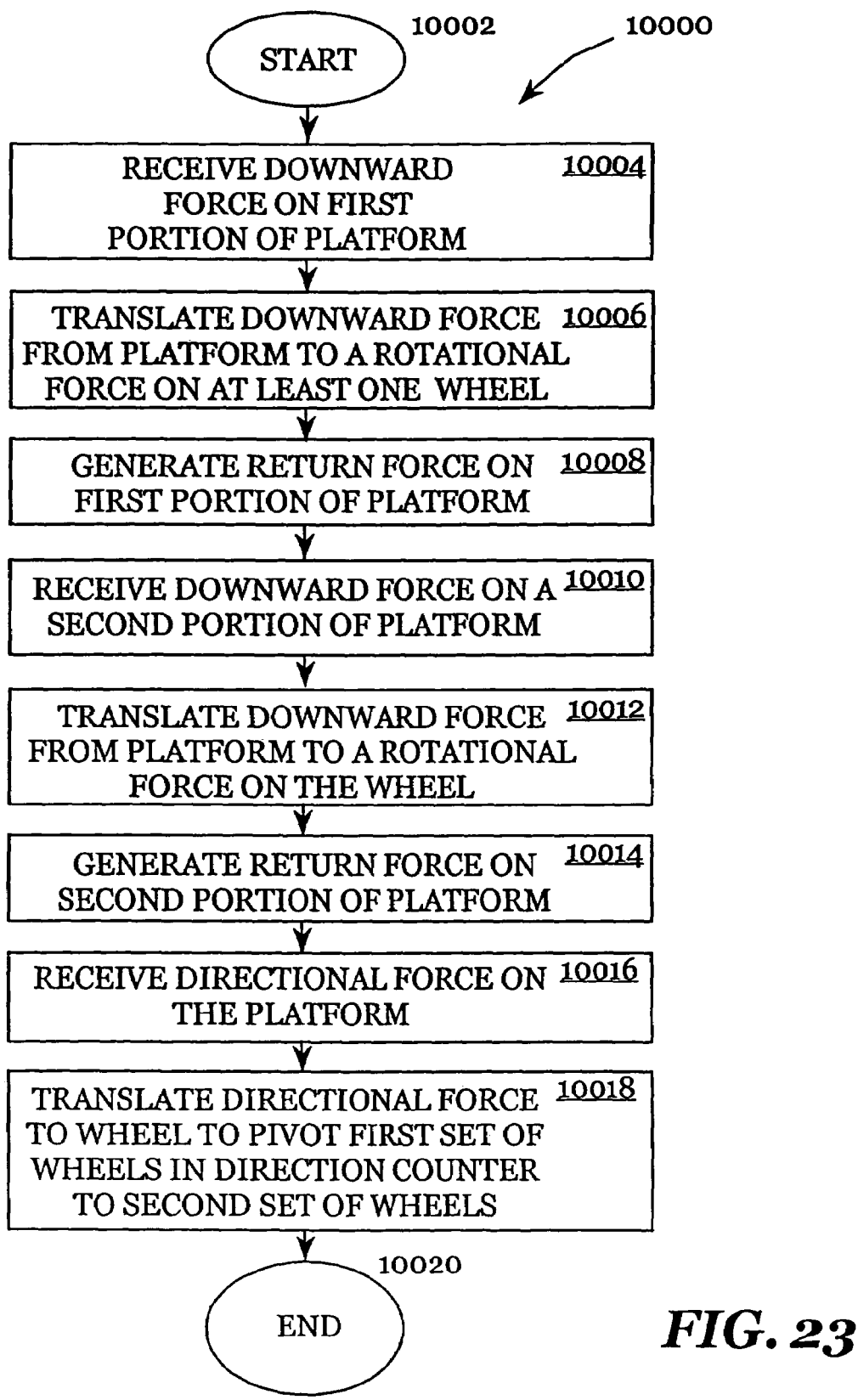
FIG. 23 is a flowchart for an exemplary embodiment of a method in accordance with the invention.

FIG. 23 is a flowchart for an exemplary embodiment of a method in accordance with the invention. In this embodiment, an apparatus such as a skateboard shown in FIGS. 1–5, 6, or 7–13 can be utilized to perform a method 10000 for propelling a platform. The method 10000 for propelling a platform begins at block 10002.

Block 10002 is followed by block 10004, in which a downward force is received on a first portion of the platform.

Block 10004 is followed by block 10006, in which the downward force from the platform is translated to a rotational force on at least one wheel.

Block 10006 is followed by block 10008, in which a return force is generated on the first portion of the platform.

Block 10008 is followed by block 10010, in which a downward force is received on a second portion of the platform;

Block 10010 is followed by block 10012, in which the downward force from the platform is translated to a rotational force on the wheel.

Block 10012 is followed by block 10014, in which a return force on the second portion of the platform is generated.

Block 10014 is followed by block 10016, in which a directional force on the platform is received.

Block 10016 is followed by block 10018, in which the directional force is translated to the wheels to pivot a first set of wheels in a direction counter to a second set of wheels, wherein the platform moves in a lateral direction.

Block 10018 is followed by block 10020, in which the method 10000 ends.

Figure 24:
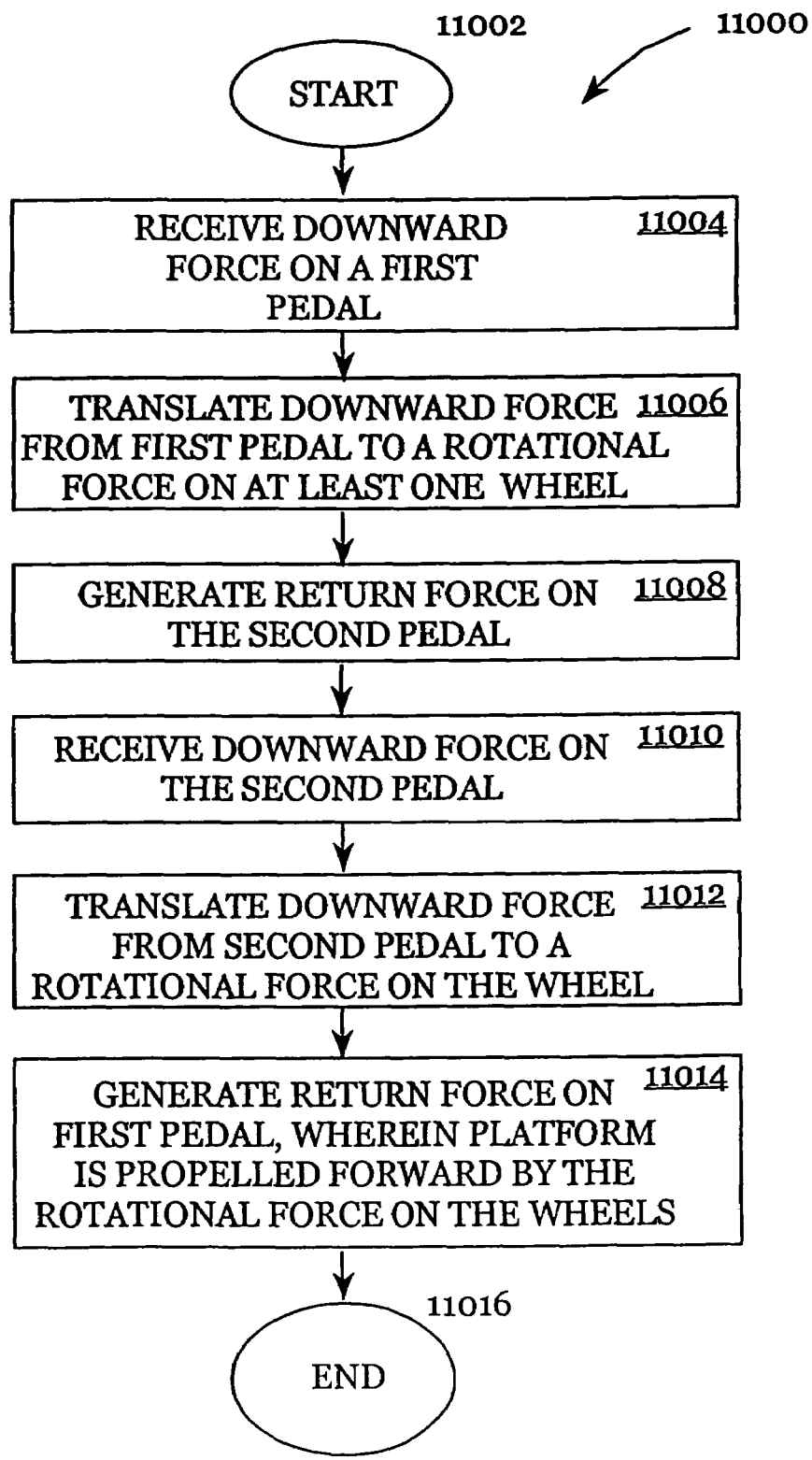
FIG. 24 is a flowchart for another embodiment of a method in accordance with the invention.

FIG. 24 is a flowchart for another embodiment of another method in accordance with the invention. In this embodiment, an apparatus such as a scooter shown in FIGS. 14–17, 18–19, 20, or 21 can be utilized to perform a method 11000 for propelling a scooter. The method 11000 for propelling a platform begins at block 11002.

Block 11002 is followed by block 11004, in which a downward force is received on a first pedal.

Block 11004 is followed by block 11006, in which the downward force from the pedal is translated to a rotational force on at least one wheel.

Block 11006 is followed by block 11008, in which a return force is generated on the first pedal.

Block 11008 is followed by block 11010, in which a downward force is received on a second pedal.

Block 11010 is followed by block 11012, in which the downward force from the second pedal is translated to a rotational force on the wheel.

Block 11012 is followed by block 11014, in which a return force is generated towards the pedals, wherein the platform is propelled forward by the rotational force on the wheels.

Block 11014 is followed by block 11016, in which the method 11000 ends.

While the above description contains many specifics, these specifics should not be construed as limitations on the scope of the invention, but merely as exemplifications of the disclosed embodiments. Those skilled in the art will envision many other possible variations that within the scope of the invention as defined by the claims appended hereto.

The invention I claim is:

1. An apparatus for propelling a user standing on the apparatus, comprising:
   a platform to support the user;
   wheels;
   a steering support adapted to transfer a directional force front the platform to pivot at least one steered wheel relative to at least one other wheel;
   a geartrain coupled to the platform, wheels, and steering support, the geartrain providing an upward return force to the platform and coupling at least one driven wheel to the platform so that downward motion of the platform causes rotation of the at least one driven wheel to propel the platform forward; and
   a brake mounted to the geartrain.

2. The apparatus of claim 1, wherein the wheels comprise a front set of wheels and a rear set of wheels, and the steering support mounts to a lower portion of the platform and to the geartrain.

3. The apparatus of claim 1, wherein the geartrain comprises an overrunning clutch.

4. The apparatus of claim 1, wherein the geartrain comprises a helical compression spring.

5. An apparatus for propelling a user, comprising:
   a platform to support the user;
   wheels;
   a hinge joint adapted to transfer a downward force from the platform to a geartrain, pivot downward in response to a downward force from the platform, and pivot upward in response to a return force;
   a geartrain coupled to the platform, wheels, and hinge joint, the geartrain coupling at least one driven wheel to the hinge joint so that a downward force from the platform rotates the geartrain causing rotation of the at least one driven wheel to propel the platform forward, and wherein the geartrain provides a return force to the hinge joint; and
   a brake mounted to the geartrain.

6. The apparatus of claim 5, wherein the geartrain comprises an overrunning clutch.

7. The apparatus of claim 5, wherein the geartrain comprises a spring.

8. An apparatus for propelling a platform, comprising:
   means for translating a downward force applied to a first portion of the platform to a rotational force on at least one wheel;
   means associated with the means for translating for generating a return force to the platform;
   means for translating a downward force applied to a second portion of the platform to a rotational force on the wheel;
   means associated with the means for translating for generating a return force on the second portion of the platform; and
   means associated with the platform for translating a directional force applied to the platform to pivot a first set of wheels in a direction counter to a second set of wheels, wherein the platform moves in a lateral direction.

9. A skateboard, comprising:
a footboard having a front and a rear;
multiple wheels;
a drive mechanism coupled to both the footboard and the wheels, the drive mechanism being configured to drive at least two of the wheels; and
a steering mechanism coupled to both the footboard and the drive mechanism, the steering mechanism being configured to pivot the drive mechanism in response to a lateral force applied to the footboard to enable steering of the skateboard.

10. The skateboard of claim 9, wherein the steering mechanism comprises:
a steering support mounted to the footboard;
a hinge joint mounted to the footboard and pivotally connecting the drive mechanism to the footboard; and
a steering linkage that couples the drive mechanism to the steering support.

11. The skateboard of claim 10, wherein the steering support is a brace mounted to the footboard with a support linkage.

12. The skateboard of claim 10, wherein the steering support is hingedly connected to the footboard such that the steering support pivots in response to movement of the footboard during steering of the skateboard.

13. The skateboard of claim 10, wherein the steering linkage comprises a vertical hinge and a horizontal binge to enable the drive mechanism to have a three-dimensional range of motion relative to the steering support.

14. The skateboard of claim 10, wherein the steering linkage pivots the drive mechanism in response to pivoting of the steering support that results from movement of the footboard during lateral pivoting of the skateboard.

15. The skateboard of claim 10, wherein the hinge joint comprises a mounting cup attached to the footboard and the drive mechanism.

16. The skateboard of claim 10, wherein the hinge joint is configured to allow the drive mechanism to pivot and slide laterally with respect to the footboard within the hinge joint in response to movement of the footboard during turning and driving of the skateboard.

17. The skateboard of claim 9, wherein the steering mechanism further comprises adjustment bolts, the adjustment bolts being configurable to increase or decrease the pivot of the drive mechanism in response to movement of the footboard during turning and driving of the skateboard.

18. A user-propelled skateboard, comprising:
a single-piece footboard having a front and a rear;
front and rear axles;
two wheels mounted to each axle;
a drive mechanism coupled to both the footboard and the axles, the drive mechanism comprising a front transmission assembly associated with the front axle and a rear transmission assembly associated with the rear axle, each transmission assembly including:
a rack mounted to the footboard with a hinge joint,
a gear train coupled to the rack and an axle, the gear train being driven by linear displacement of the rack, and
a support that is connected to the footboard at a pivot point and connected to both transmission assemblies at a linkage;
wherein the footboard is pivotable about the pivot point so as to be alternately pivoted downward at the front and rear to displace the racks and thereby drive their gear trains to, in turn, drive the wheels such that such, front and rear alternate pivoting drives the skateboard in a forward direction.

19. The skateboard of claim 18, further comprising a steering mechanism coupled to both the footboard and the drive mechanism, the steering mechanism including:
a steering support connected to the footboard;
a hinge joint connected to the footboard and to the drive mechanism; and
a steering linkage connected to the drive mechanism and the steering support;
wherein the application of a lateral force to the footboard pivots the steering support, which in turn pivots the steering linkage, which in turn pivots the wheels to turn the skateboard.

20. The skateboard of claim 18, wherein the transmission assembly further comprises a compression spring that provides an expansion force between the footboard and the transmission assembly so as to urge the footboard away from the transmission assembly.

* * * * *